United States Patent
Jankly et al.

(10) Patent No.: US 11,438,300 B2
(45) Date of Patent: *Sep. 6, 2022

(54) ALTERNATE CONTROL CHANNEL FOR NETWORK PROTOCOL STACK

(71) Applicant: Raytheon Company, Waltham, MA (US)

(72) Inventors: Steve P. Jankly, Pasadena, CA (US); Neil R. Epstein, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/891,949

(22) Filed: Jun. 3, 2020

(65) Prior Publication Data
US 2021/0119963 A1     Apr. 22, 2021

Related U.S. Application Data

(63) Continuation-in-part of application No. 16/654,940, filed on Oct. 16, 2019.

(51) Int. Cl.
*H04L 61/50* (2022.01)
*H04L 69/16* (2022.01)
(Continued)

(52) U.S. Cl.
CPC .......... *H04L 61/20* (2013.01); *H04L 61/6063* (2013.01); *H04L 69/161* (2013.01); *H04L 69/22* (2013.01)

(58) Field of Classification Search
CPC ..... H04L 67/40; H04L 69/161; H04L 69/164; H04L 69/22; H04L 67/1097; G06F 13/28; G06F 16/10
See application file for complete search history.

(56) References Cited

U.S. PATENT DOCUMENTS

| 7,464,174 B1 | 12/2008 | Ngai |
| 8,498,206 B2 | 7/2013 | Mraz |

(Continued)

FOREIGN PATENT DOCUMENTS

| CA | 2753747 A1 * | 6/2012 | ......... H04L 67/1002 |
| EP | 1307028 A2 | 5/2003 | |

(Continued)

OTHER PUBLICATIONS

"U.S. Appl. No. 16/364,920, Notice of Allowance dated Oct. 29, 2020", 7 pgs.
"U.S. Appl. No. 16/364,920, Response filed Jul. 23, 2020 to Non Final Office Action dated May 14, 2020", 16 pgs.
"International Application Serial No. PCT/US2020/024626, International Search Report dated Jun. 17, 2020", 3 pgs.
"International Application Serial No. PCT/US2020/024626, Written Opinion dated Jun. 17, 2020", 7 pgs.

(Continued)

*Primary Examiner* — Rina C Pancholi
(74) *Attorney, Agent, or Firm* — Schwegman Lundberg & Woessner, P.A.

(57) ABSTRACT

Methods, systems, and computer-readable mediums for an alternate control channel for a network protocol stack are disclosed. In some embodiments a controller device provides instructions to one or more source devices. The controller device instructs the one or more source devices to override network parameters associated with network communication performed by the source devices. The network parameters to be overridden may include transport level source ports, source network addresses, or source link level addresses. In some embodiments, a range of override values are specified. In some of these aspects, a source device may perform time division multiplexing via the multiple override values, such that data generated by a single device may appear to be transmitted by multiple devices.

20 Claims, 13 Drawing Sheets

(51) Int. Cl.
*H04L 101/663* (2022.01)
*H04L 69/22* (2022.01)

(56) References Cited

U.S. PATENT DOCUMENTS

| | | | |
|---|---|---|---|
| 8,560,646 | B1 | 10/2013 | Marshall et al. |
| 10,942,888 | B2 | 3/2021 | Epstein et al. |
| 2005/0240932 | A1* | 10/2005 | Billau .................. G06F 9/5072 718/104 |
| 2009/0094353 | A1* | 4/2009 | Isobe .................. G06F 15/177 709/221 |
| 2009/0248896 | A1 | 10/2009 | Cohn |
| 2010/0048205 | A1 | 2/2010 | Guilford et al. |
| 2014/0052808 | A1 | 2/2014 | Krishnan et al. |
| 2014/0269487 | A1* | 9/2014 | Kalkunte ................. H04L 47/32 370/312 |
| 2015/0156289 | A1 | 6/2015 | Pandit et al. |
| 2016/0112370 | A1 | 4/2016 | Theogaraj et al. |
| 2016/0323164 | A1 | 11/2016 | Cao |
| 2017/0012977 | A1 | 1/2017 | Li et al. |
| 2017/0155717 | A1 | 6/2017 | Tamir et al. |
| 2017/0171075 | A1 | 6/2017 | Sajeepa et al. |
| 2017/0003391 | A1 | 11/2017 | Lee |
| 2019/0171612 | A1 | 6/2019 | Shahar et al. |
| 2020/0311014 | A1 | 10/2020 | Epstein et al. |
| 2021/0120108 | A1 | 4/2021 | Jankly et al. |

FOREIGN PATENT DOCUMENTS

| | | | | |
|---|---|---|---|---|
| WO | WO-03036465 | A2 * | 5/2003 | ............. G06F 9/544 |
| WO | WO-03036465 | A2 | 5/2003 | |
| WO | WO-2020198308 | A1 | 10/2020 | |
| WO | WO-2021076213 | A1 | 4/2021 | |
| WO | WO-2021247693 | A1 | 12/2021 | |

OTHER PUBLICATIONS

"International Application Serial No. PCT/US2020/046485, International Search Report dated Oct. 13, 2020", 4 pgs.

"International Application Serial No. PCT/US2020/046485, Written Opinion dated Oct. 13, 2020", 6 pgs.

"U.S. Appl. No. 16/364,920, Non Final Office Action dated May 14, 2020", 22 pgs.

"U.S. Appl. No. 16/654,940, Response filed Sep. 9, 2021 to Non Final Office Action dated Jun. 10, 2021", 11 pgs.

"U.S. Appl. No. 16/364,920, 312 Amendment filed Jan. 27, 2021", 7 pgs.

"U.S. Appl. No. 16/654,940, PTO Response to Rule 312 Communication dated Feb. 5, 2021", 2 pgs.

"U.S. Appl. No. 16/654,940, Non Final Office Action dated Jun. 10, 2021", 36 pgs.

"International Application Serial No. PCT/US2021/035434, International Search Report dated Aug. 4, 2021", 4 pgs.

"International Application Serial No. PCT/US2021/035434, Written Opinion dated Aug. 4, 2021", 7 pgs.

"International Application Serial No. PCT/US2020/024626, International Preliminary Report on Patentability dated Oct. 7, 2021", 6 pgs.

"U.S. Appl. No. 16/654,940, Advisory Action dated Mar. 10, 2022", 3 pgs.

"U.S. Appl. No. 16/654,940, Final Office Action dated Dec. 15, 2021", 29 pgs.

"U.S. Appl. No. 16/654,940, Response filed Feb. 15, 2022 to Final Office Action dated Dec. 15, 2021", 10 pgs.

"International Application Serial No. PCT/US2020/046485, International Preliminary Report on Patentability dated Apr. 28, 2022", 8 pgs.

* cited by examiner

ALTERNATE CONTROL CHANNEL FOR NETWORK PROTOCOL STACK

CROSS REFERENCE TO RELATED APPLICATIONS

This application is a continuation in part of, and claims priority to, U.S. patent application Ser. No. 16/654,940, filed Oct. 16, 2019 and entitled "Alternate Control Channel for Network Protocol Stack." The contents of this prior application are considered part of this application, and are hereby incorporated by reference in their entirety.

TECHNICAL FIELD

Embodiments disclosed herein relate to network communications. Some embodiments relate to data transfer between nodes of a network.

BACKGROUND

Many modern requirements of electronic systems require those systems to consume fewer and fewer resources. Systems designed under these requirements may be referred to as constrained by Size, Weight and Power (SWaP). Because these devices are designed under these constraints, they may not include many of the hardware and/or software capabilities common in a modern computing environment having more resources available. This lack of resources can create challenges in accomplishing many important functions, such as keeping track of peripheral nodes that lack a fully implemented network stack, challenges streaming data from a peripheral device, such as a sensor, which may lack proper network interface definitions to communicate with target nodes within a network. Many SWaP constrained systems also include limited space for hardware components, making implementations of these capabilities that much more challenging.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

Figure 1A:
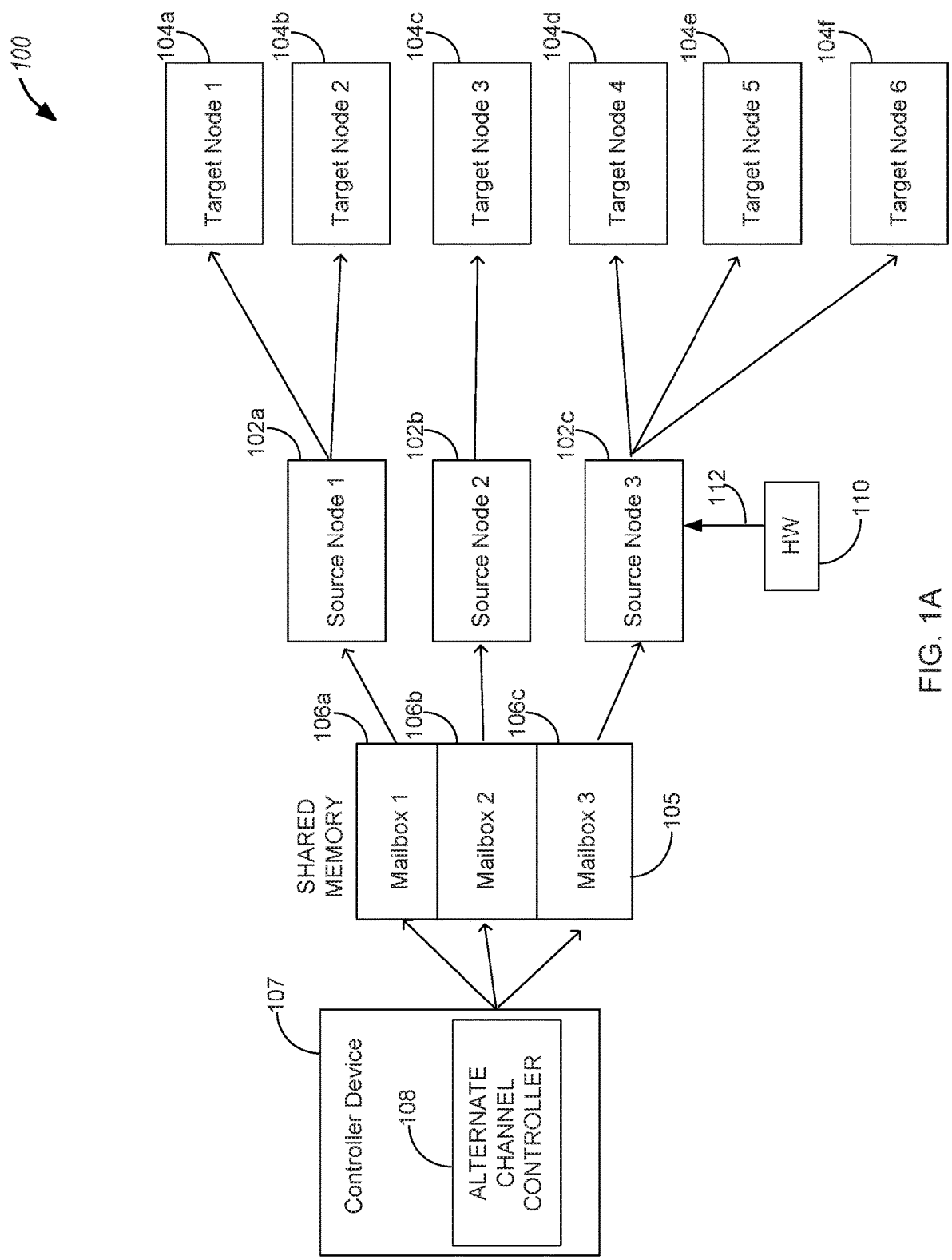
FIG. 1A is an overview diagram of a system implementing one or more of the disclosed embodiments.

The following detailed description and the drawings sufficiently illustrate specific embodiments to enable those skilled in the art to practice them. Other embodiments may incorporate structural, logical, electrical, process, and other changes. Portions and features of some embodiments are included in, or substituted for, those of other embodiments. Embodiments set forth in the claims encompass all available equivalents of those claims.

DETAILED DESCRIPTION

Disclosed are embodiments for implementation of an alternative control channel for a network protocol stack. In some embodiments, the network protocol stack is implemented in a SWaP constrained device. Thus, the network protocol stack is under various hardware-based constraints with respect to memory, processor size and/or speed, and/or power available. These hardware constraints may give rise to software-based constraints as well. For example, given limited memory and/or processor resources, some of the disclosed devices may lack software that would otherwise provide network capabilities available in more fully featured implementations.

The disclosed embodiments provide for control inputs to be provided to one or more source devices. The source devices are SWaP constrained devices in some aspects. In some embodiments, the control inputs are provided via a shared memory that is accessible to each of the source devices. From the shared memory, each of the source devices reads configuration information that defines the one or more control inputs. In some embodiments, the control inputs are provided by messages exchanged between a wireless node array controller (WNAC) and a control channel manager of a source device.

The control inputs may alter one or more network protocol stack control parameters the source device is utilizing to communicate on a network. The parameters may control one or more "layers" in the network protocol stack. For example, the parameters may control a transport, network, or link layer of the network protocol stack. In some aspects, the parameters may include source port identification (e.g. a UDP source port), source network address information (e.g. an Internet Protocol address), or source link address information (e.g. station address). However, the disclosed embodiments are not limited to these examples.

The one or more source devices are controlled via a controller, that communicates to the source nodes via either the shared memory or messages exchanged over a wireless network. In embodiments utilizing a shared memory for communication, each of the source nodes are allocated a portion of the shared memory which is used for communication between the controller and the source device. For example, in some aspects, each source node is allocated a portion of the shared memory that include a message pointer and a message waiting indicator. The controller may set the message waiting indicator while the source node may clear the message waiting indicator upon consuming a message from the shared memory mailbox.

In embodiments exchanging messages over a wireless network to facilitate control of source devices, a variety of design approaches are employed in some of these embodiments. Some embodiments implement a publish/subscribe model between a WNAC executing in a controller device and a control channel manager executing in the source device. After a connection between the source device and the controller device is established, the source device subscribes to control parameter updates made by the controller device. As the controller updates control parameters, the source device is notified and adjusts its operation consistent with the control parameters. In these embodiments, the WNAC dynamically creates and updates unique hardware identifications available to source devices to which they are connected via the wireless network. To manage communications with the WNAC, each source device implements, in at least some embodiments, a client service, which receives messages from the WNAC and effects any changes necessary within the source device. This provides for dynamic assignment and/or reassignment of hardware identifications. Because the WNAC and source device communicate over a wireless network, several different wireless protocols are utilized by various embodiments, including, but not limited to Long Term Evolution (LTE) and other cellular protocols, a low power wide-area network (LPWAN), Zigbee, satellite communications, WiFi, Bluetooth, Z-Wave, Radio Frequency Identification (RFID), or near-field communication (NFC).

Hardware identifications contemplated by the disclosed embodiments includes various identification fields in packet formats of various wireless protocols. This includes, but is not limited to, fields such as service set identifiers, and network addresses. Definitions in communications standards such as LTE Packet Core elements, including Packet Data Convergence Protocol (PDCP), Radio Link Control (RLC), Medium Access Control (MAC) can be dynamically assigned by the disclosed embodiments.

The controller device may, in some embodiments, cause display of a user interface that provides user interface controls allowing for control of the source devices. In some aspects, the controller device reads configuration information for one or more of the source devices from a configuration file. The configuration file is manually edited via a text editor in some embodiments. In some other embodiments, the configuration file is programmatically modified, either automatically via another control program or via a configuration user interface. The details of the solution will become more apparent in the discussion below.

FIG. 1A is an overview diagram of a system 100 implementing one or more of the disclosed embodiments. FIG. 1A shows three source nodes or devices 102a-c. The three source devices 102a-c are communicating with six target nodes or devices 104a-f. Source device 102a is sending data to target devices 104a and 104b. Source device 102b is sending data to target device 104c. Source device 102c is sending data to target devices 104d-f. Each of the source devices 102a-c are reading control information from a shared memory 105. The shared memory 105 is divided into at least three mailboxes 106a-c. Each of the mailboxes 106a-c is allocated for communication with one of the source devices 102a-c respectively.

FIG. 1A also shows a controller device 107. The controller device 107 runs a alternate channel controller 108, which is, in some embodiments, a software or firmware module. The alternate channel controller 108 also has access to the shared memory 105. The alternate channel controller 108 is configured to send instructions, such as network configuration parameters, to each of the source devices 102a-c via its respective mailbox 106a-c respectively.

FIG. 1A also shows external hardware 110. External hardware 110 may comprise a field programmable gate array (FPGA) or other hardware capable of generating interrupt or discrete signals via connection 112. As discussed further below, some embodiments are configured to receive discrete signals from external hardware 110 to trigger switching of overwrite values as discussed further below.

Figure 1B:
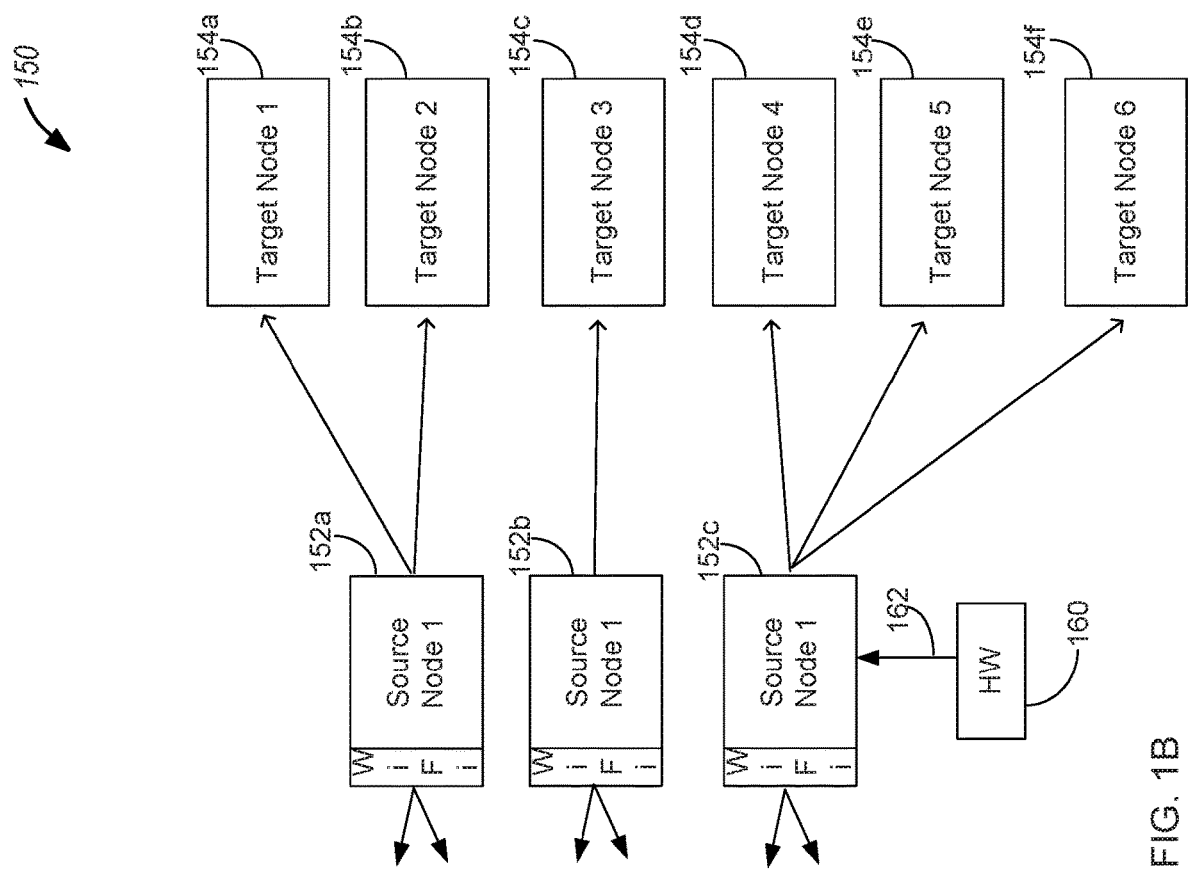
FIG. 1B is an overview diagram of a system implementing one or more of the disclosed embodiments.
Figure 1B:
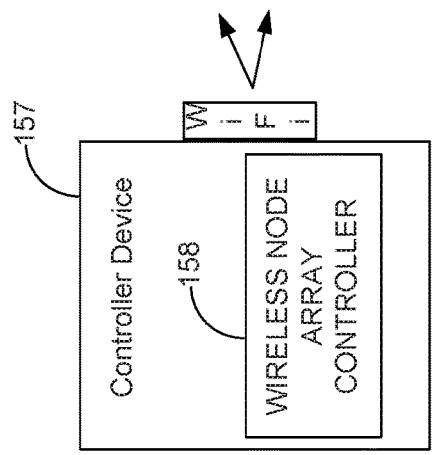

FIG. 1B is an overview diagram of a system 150 implementing one or more of the disclosed embodiments. FIG. 1B shows a controller device 157 in wireless communication with a plurality of source nodes, labeled as source nodes 152a-c. Similar to the configuration described above with respect to FIG. 1A, the source codes are in communication with one or more target nodes, labeled as target nodes 154a-f. As shown, source node 152a is in communication with two target nodes, 154a and 154b. Source node 152b is in communication with target node 154c. Source node 152c is in communication with target nodes 154d-f.

The controller device 157 includes a WNAC 158. The WNAC 158 includes, in at least some embodiments, instructions that configure hardware processing circuitry of the controller device 157 to perform one or more of the functions discussed herein that are attributed to the WNAC 158.

The WNAC 158 provides, in at least some embodiments, control of the source nodes 152a-c with respect to which source addresses each of the source nodes 152a-c are using when communicating with the target nodes 154a-f. For example, the WNAC 158 is able to command any one or more of the source nodes 152a-c to change a source address used for network communications in response to a command received from the WNAC 158. In some embodiments, a source node (e.g. 152a-c) communicates status back to the WNAC 158 that may trigger certain control decisions by the WNAC 158. For example, in some embodiments, if an unknown device is attempting to access a source node, that source node sends a notification to the WNAC of the unknown device and its attempted access.

Because the WNAC 158 and the source nodes 152a-c communicate over a wireless network, some embodiments provide for discovery of any one or more of the source nodes 152a-c by the WNAC 158 via a wireless message that is broadcast by the individual source nodes 152a-c. Once the WNAC 158 has discovered an individual source node, the WNAC 158 communicates with the source node over a wireless network, such as a WiFi network. In some embodiments, a publish/subscribe messaging model is utilized for the communication between the WNAC 158 and an individual source node. For example, a source node, in some embodiments, subscribes to a source address parameter that is subject to modification by the WNAC 158. Upon modification of the source address parameter by the WNAC 158, the source node receives a notification of the modification. Upon receipt of the notification, the source node changes a source address it is using to communicate with one or more target nodes, to be consistent with the modified value.

Similar to the external hardware 110 illustrated in FIG. 1A, FIG. 1B also shows external hardware 160. External hardware 160 may comprise a field programmable gate array (FPGA) or other hardware capable of generating interrupt or discrete signals via connection 162. As discussed further below, some embodiments are configured to receive discrete signals from external hardware 160 to trigger switching of overwrite values as discussed further below.

In some embodiments, communication between the controller device 157/WNAC 158 and the source nodes 152a-c utilizes encryption to prevent nefarious actors from interfering with the communications. In some embodiments, a block cipher encryption solution is utilized. For example, or advanced encryption standard (AES) or the triple data encryption standard (3DES) are employed for communications between the controller device 157/WNAC 158 and the source nodes 152a-c. In some embodiments, multiple keys are managed separately for source nodes 152a-c and target nodes 154a-f. Target nodes 154a-f would generally not communicate directly with the WNAC 158. The target nodes are preconfigured with keys for decryption. Key management between source devices and the WNAC 158 would be per NIST publication 800-57 in some embodiments.

Figure 2:
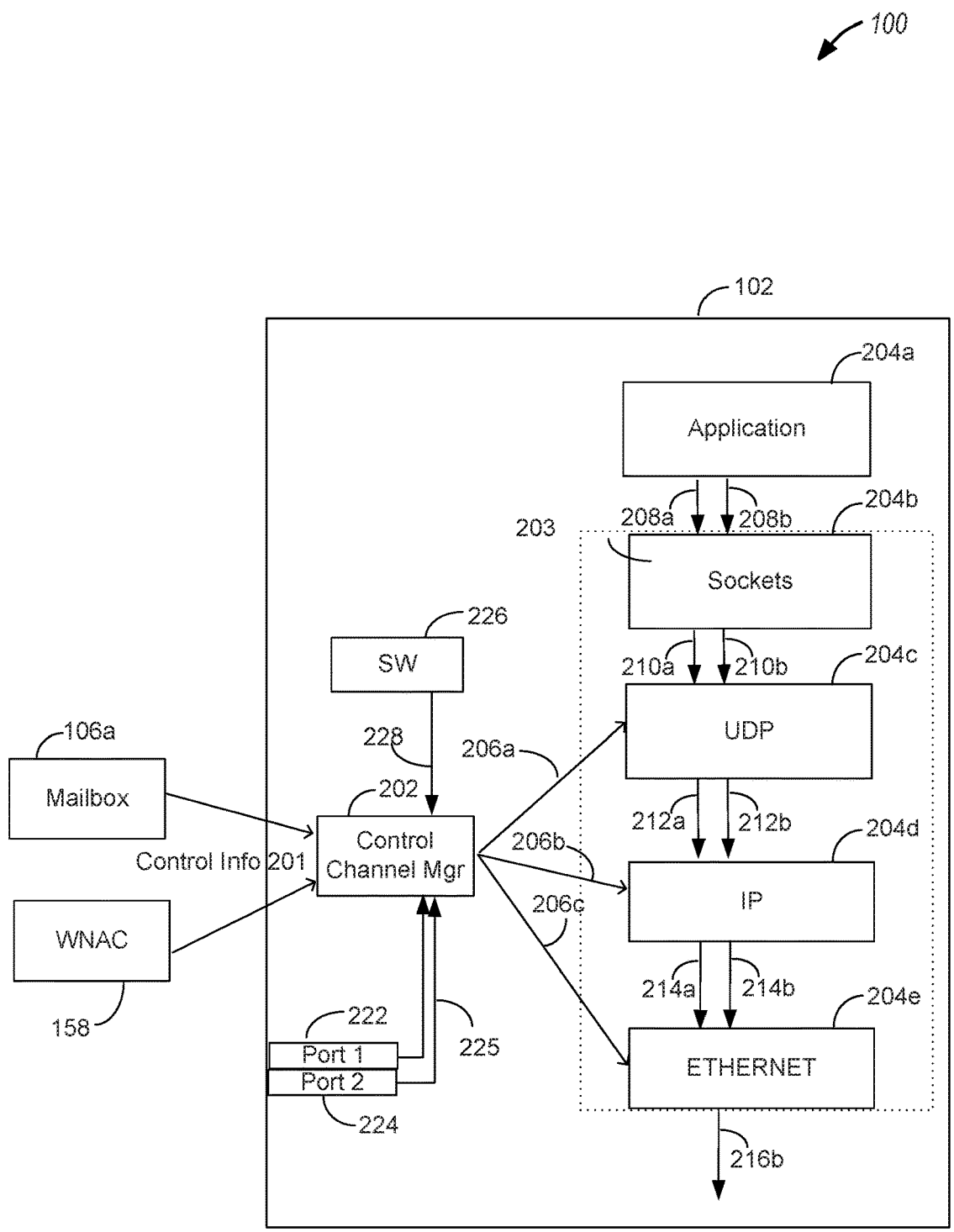
FIG. 2 shows an example implementation of a source device, such as any of the source devices discussed above with respect to FIG. 1A.

FIG. 2 shows an example implementation of a source device 102, such as any of the source devices 102a-c discussed above with respect to FIG. 1A, or the source devices 152a-c discussed above with respect to FIG. 1B. The example source device 102 includes a control channel manager 202. The control channel manager 202 may represent a set or group of instructions that configure hardware processing circuitry to perform one or more of the functions discussed below and attributed to the control channel manager 202.

The control channel manager 202 obtains control information 201 for the source device 102 via a variety of techniques, depending on embodiment. In some embodiments, for example, some embodiments consistent with the system 100 of FIG. 1A, the control channel manager 202 of the source device 102 reads control information 201 from the shared memory 105, discussed above with respect to FIG. 1A. In some other embodiments, for example, those embodiments consistent with the system 150 discussed above with respect to FIG. 1B, the control channel manager 202 exchanges messages with the WNAC 158 over a wireless network to obtain control information 201. In these embodiments, the control channel manager does not interface with the mailbox 106a as shown in FIG. 2. In embodiments utilizing a shared memory based mailbox (e.g. mailbox 106a), the control channel manager 202 does not necessarily interface with the WNAC 158 for control information.

The control information 201 indicates alternative control information for a network protocol stack 203 included in the source device 102. To facilitate control of the network protocol stack 203, the example source device 102 shown in FIG. 2 includes data communication channels 206a-c between the control channel manager 202 and various components of the network protocol stack 203 included in the source device 102. The example network protocol stack 203 includes a sockets layer 204b, transport layer 204c (shown as implanting a user datagram protocol (UDP) protocol), a network layer 204d (shown as implementing Internet Protocol (IP), and a link layer 204e (shown as implementing an Ethernet protocol, but other link protocols, such as Fiber Channel are also contemplated).

Above the sockets layer 204b of the network protocol stack 203 is a network application 204a. The network application 204a invokes control and data method(s) 208a-b respectively of the sockets layer 204b to generate network communication by the example source device 102. While FIG. 2 shows an example network protocol stack 203 that includes the sockets layer 204b, transport layer 204c (e.g. user datagram protocol (UDP), network layer 204d (e.g. the IP protocol), and a link layer 204e, one of skill in the art would understand that this is just one example of a network protocol stack and the disclosed embodiments are not limited to this example.

FIG. 2 shows the network application 204a invoking control and data method(s) 208a-b respectively of the sockets layer 204b. The control method(s) 208a modify one or more control parameters of one or more of the layers below the sockets layer 204b. For example, the control method(s) 208a may function to allow the network application 204a to specify a source and/or destination port for use by the transport layer 204c (e.g. UDP protocol). A specified source and/or destination port overwrites a second source and/or destination port that may have been provided by the network application 204a.

The control method(s) 208a may further specify a source and/or destination network address (e.g. such as a source IP address (IPv4 or IPv6) and/or a source and/or destination link level address, such as a source Ethernet address. In some implementations of the network protocol stack 203, each interface between a layer N and a layer N+1 includes both control and data methods. These are shown in FIG. 2 as control and data methods 210a-b, 212a-b, and 214a-b, which provide for the control of parameters between each of the sockets layer 204b and transport layer 204c, transport layer 204c and network layer 204d, and network layer 204d and link layer 204e respectively. FIG. 2 also shows a data path 216b which represents a data output of the link layer 204e.

As discussed above, in various embodiments, one or more communication channels between the control channel manager 202 and a component of the network protocol stack 203 is provided. These control channels allow the control channel manager 202 to override/overwrite at least some of the control parameters that may have been provided by the network application 204a via the control methods, such as the control method(s) 208a. Thus, while the network application 204a may specify a source service access point (SAP) value of, for example, 123, the control channel manager 202 may specify a source SAP value of 321. In this case, the transport layer 204c utilizes the input provided by the control channel manager 202 and essentially ignores or overwrites the input provided by the network application 204a.

In some embodiments, the control channel manager 202 may obtain alternative station address information from control information 201 received by the control channel manager 202 via either the shared memory based mailbox 106a or via an exchange of messages with the WNAC 158. The station address information may define a link level station address to be applied by the link layer 204e as a source station address when sending data generated by the network application 204a. The defined link level station address may override a station address provided in hardware of the source device 102. For example, the source device 102 may include a network interface that includes a station address that is provided during manufacturing of the network interface. The station address obtained from the control information 201 is used to override this factory supplied station address and any other station address that may have been provided. In other words, control information 201 provided via either the shared memory 105 or via message exchanges with the WNAC 158 by the control channel manager 202 has the highest priority of any control information that is available. Thus, if conflicts exist between multiple versions of control information for any portion of the network protocol stack 203, control information 201 provided by the control channel manager 202 takes precedence over any other configuration information.

In some embodiments, the control channel manager 202 obtains alternative network address information from the control information 201. In some embodiments, the control channel manager 202 obtains alternative source SAP information from the control information 201. The control channel manager 202 configures the transport layer 204c (e.g. UDP) to utilize the alternative source SAP based on obtaining the instructions from the control information 201.

FIG. 2 shows that the control channel manager 202 can receive discrete signals 225 from a hardware port, such as hardware ports 222 and/or 224. In some embodiments, the external hardware 110 or 160 discussed above with respect to FIG. 1A and FIG. 1B respectively is connected to one of the hardware ports 222 or 224 shown in FIG. 2. In some embodiments, the discrete signals 225 received via one or more of the hardware ports 222 or 224 function as a trigger for the control channel manager 202 to switch an overwritten value from a first value to a second value. For example, in one example embodiment, the control channel manager 202 may overwrite a source Ethernet address utilized by the link layer 204e from a first value to a second value upon reception of a discrete signal from the hardware port 224. Similarly, FIG. 2 shows that the control channel manager 202, in some embodiments, is configured to receive software signals 228 from software 226. For example, software 226 may generate a POSIX type signal that is received by the control channel manager 202. Upon receiving the signal from the software 226, the control channel manager is, in some embodiments, configured to switch an overwritten parameter from a first value to a second value, as discussed further below.

Figure 3:
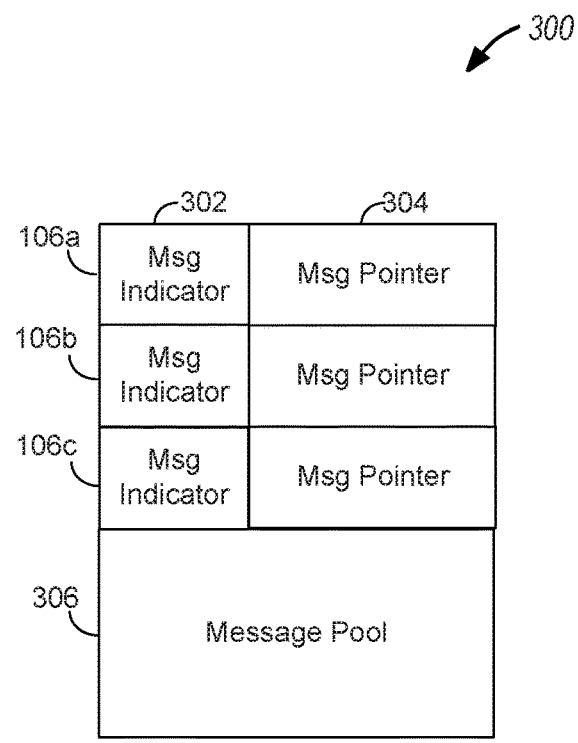
FIG. 3 shows one example of a mailbox data structure that is implemented in one or more of the disclosed embodiments.

FIG. 3 shows one example of a mailbox data structure 300 that is implemented in one or more of the disclosed embodiments. In some embodiments, the shared memory 105 discussed above with respect to FIG. 1A may conform with the format of the mailbox data structure 300 of FIG. 3. The mailbox data structure 300 includes three mailboxes 106a-c, consistent with the description of FIG. 1A above. Each mailbox 106a-c includes a message indicator 302 and a message pointer 304. The message indicator 302 indicates whether the respective mailbox includes an unread message. In some embodiments, the message indicator 302 is set by a device or module adding a message to the mailbox (e.g., alternate channel controller 108), and is cleared by a device or module consuming the message (e.g., control channel manager 202) after consuming the message. The message pointer 304 points to a portion of shared memory including the unread message that is indicated by the message indicator 302.

The message pool 306 provides memory for messages. The messages may vary by embodiment, with an example message format discussed below with respect to FIG. 4. Messages in the message pool 306 are managed according to traditional dynamic memory management techniques, at least in some aspects.

In some embodiments, a producer and/or consumer of messages passed via the mailboxes 106a-c may implement separate queuing mechanisms to facilitate buffering of messages as necessary before they are produced/consumed. For example, if the alternate channel controller 108 generates a message for communication to a source device (e.g., any source device 102a-c), but the mailbox (e.g., any of 106a-c) indicates a message is already posted to the mailbox (e.g. a previous message has not yet been consumed by the source device), then the alternate channel controller 108 may queue the first message until the mailbox becomes available. Similarly, in some aspects, a source device (e.g., implementing a control channel manager 202) may immediately remove a message from its mailbox (e.g., any of 106a-c) once it has detected the message. In some embodiments, the message is queued on a queue internal to the control channel manager 202 until data from the message is processed and the message is no longer needed. The message may then be returned to the message pool for reuse. By immediately removing messages upon detection, the control channel manager 202 prevents the mailbox (e.g., 106a-c) from becoming a bottleneck for communication between the alternate channel controller 108 and the control channel manager 202.

Figure 4:
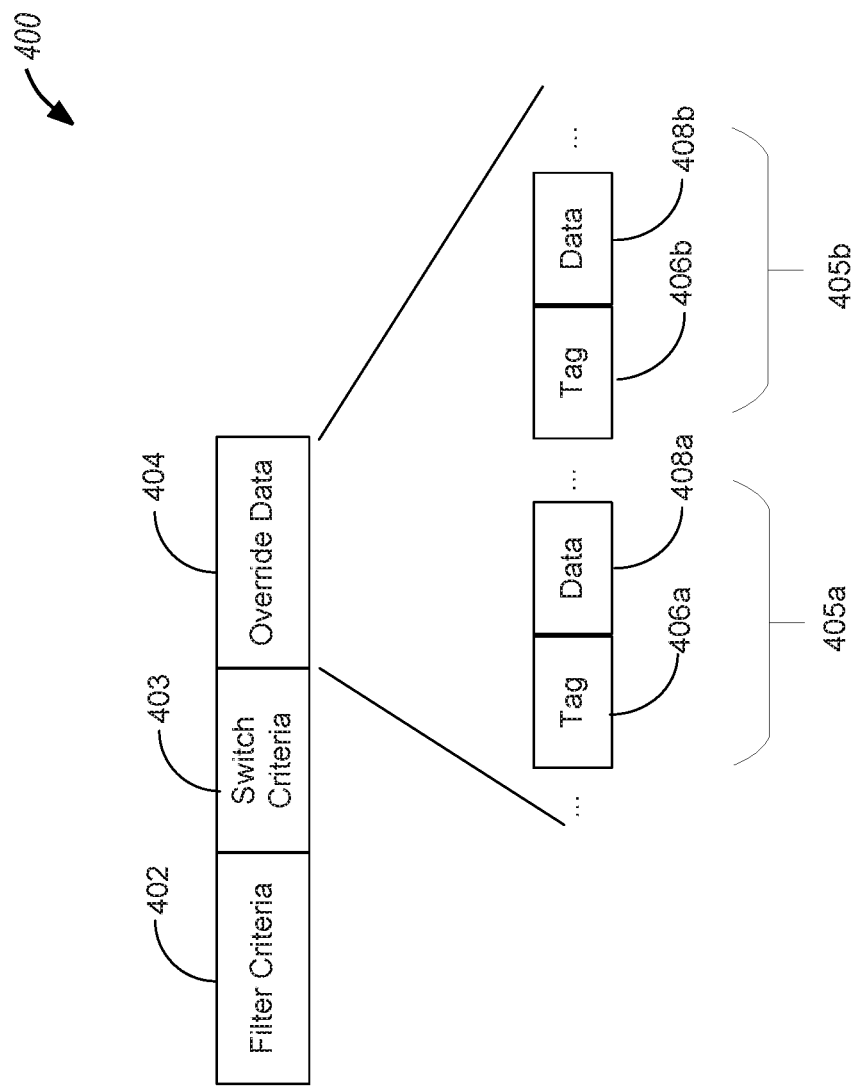
FIG. 4 shows an example message format for a message that is communicated between the alternate channel controller and the control channel manager in some of the disclosed embodiments.

FIG. 4 shows an example message format for a message that is communicated between the alternate channel controller 108 and the control channel manager 202, or between the WNAC 158 and the control channel manager 202, in at least some of the disclosed embodiments. The message 400 includes filter criteria field 402 and an override data field 404. The filter criteria field 402 defines one or more filter criterion to be applied to a packet. If the packet matches the filter criterion, then the override data specified by the override data field 404 is applied to the packet. If none of the one or more criterion defined by the filter criteria field 402 match the packet, the packet is allowed to pass without override data being applied. The switch criterion field 403 defines criterion for switching between overwritten values. For example, the switch criterion field 403 defines, in some embodiments, when a first SAP value is used or overwritten to a source SAP field in packets transmitted by a device and when the overwrite operation switches from the first SAP value to a second SAP value.

The override data field 404 defines one or more data that are to be written to an outbound packet by a source device (e.g., any source device 102a-c or 152a-c). The override data field 404 includes one or more groups of fields, shown in FIG. 4 as groups 405a and 405b. Each field group includes a tag field (e.g. tag field 406a and/or tag field 406b) and a data field (e.g., data field 408a and/or data field 408b). The tag may identify a type of data included in corresponding data field within a group. In some aspects, predefined numbers are associated with data types. For example, a first predefined number may identify a source network address data type (e.g., an IP address), a second predefined number may identify a transport level source port data type (e.g., a UDP source port). A third predefined number identifies a source link level address (e.g., an Ethernet station address). Additional predefined numbers may identify ranges of these values (e.g., a source port range, network address range, or link level address range). In some aspects, each individual network parameter value within the range are assigned or associated with a criterion for applying the individual value within the range. This criterion may also be specified in the associated data field 408a or 408b.

The message 400 may provide for configuring a source device (e.g., 102a-c or 152a-c) to overwrite network parameters within a network stack (e.g., 205) as specified by the alternate channel controller 108 or WNAC 158.

Figure 5A:
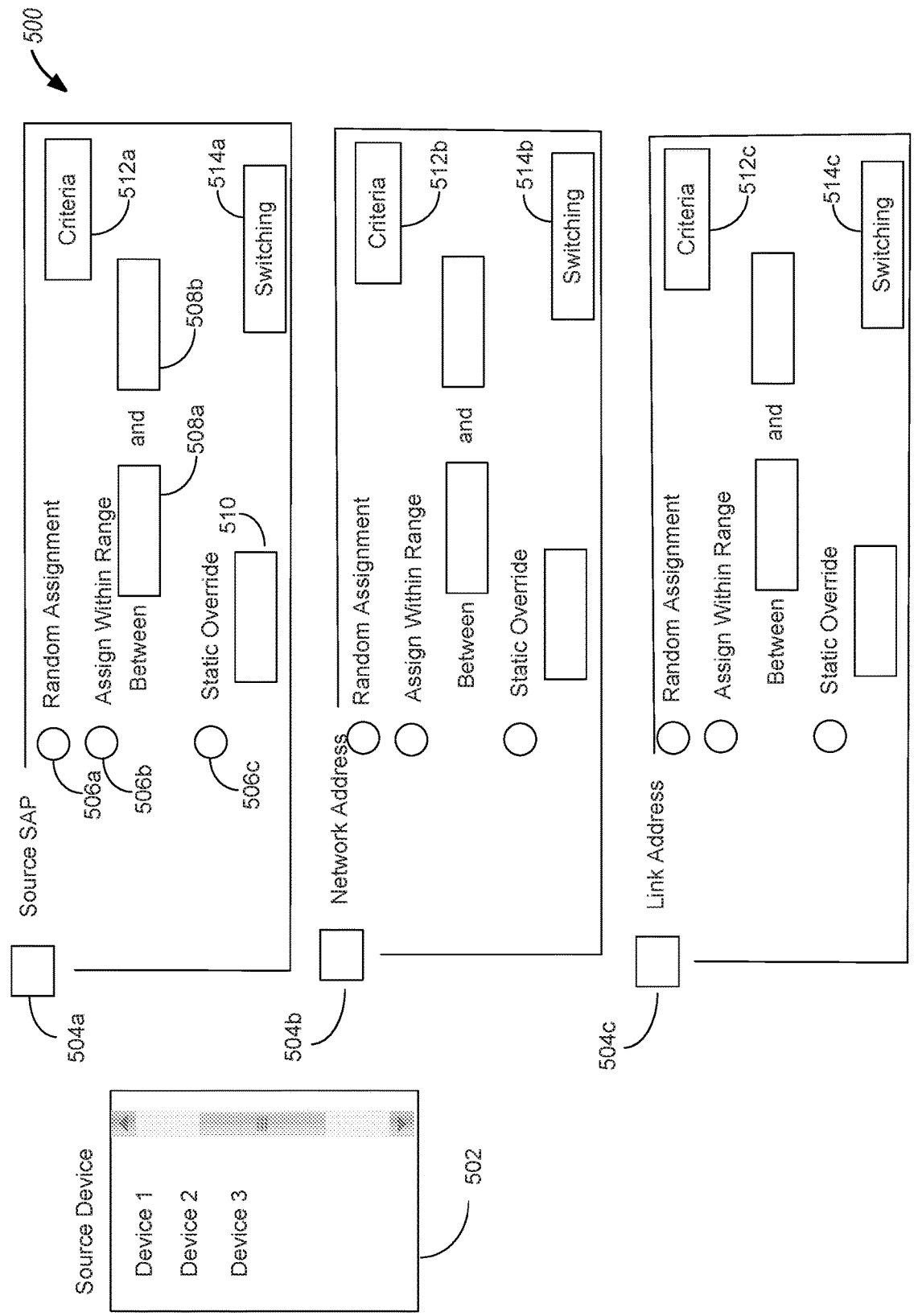
FIG. 5A shows an example user interface that is implemented in one or more of the disclosed embodiments.

FIG. 5A shows an example user interface 500 that is implemented in one or more of the disclosed embodiments. FIG. 5A includes a device list box 502. The device list box 502 provides for selection of a particular source device. Example devices device 1, device 2, and device 3 are listed. In some embodiments, these three devices correspond to source devices 102a-c, discussed above with respect to FIG. 1A, and/or source devices 152a-c discussed above with respect to FIG. 1B.

For a device selected in the device list box 502, the user interface 500 provides configuration parameters, set via the check boxes 504a-c. The check box 504a provides for setting of configuration parameters relating to a source SAP. For example, selection of the check box 504a may indicate a source transport level SAP (e.g., UDP sap) is to be overwritten by the device selected in device list box 502. When the check box 504a is selected, further user interface controls provide for additional specification of an overwrite of the source SAP. Radio buttons 506a-c provide for selection of random assignment of a source SAP (via 506a), a range of values from which to assign a source SAP (via 506b), or a static, single value for the source SAP (via radio button 506c). When selecting a range of values via radio button 506b, a start of the range is specified via edit field 508a and an end value of the range is specified via edit field 508b. Some embodiments may provide for selection of a source SAP from the specified range via different methods. For example, some embodiments may provide for random selection of a source sap within the range, sequential selection of a source SAP within the range, or reverse sequential selection (numerical high to numerical low value). When a static value is specified via radio button 506c, an edit box 510 is provided for entering a value of the static overwritten value. When check box 504a is selected, further selection of control 514a displays, in some embodiments, a user interface configured to accept input defining switching parameters. The switching parameters are described further below with respect to FIG. 5B. Each of the controls 514a-c, in some embodiments, are disabled when static override of parameters is chosen, for example, via radio button 506c and edit box 510, or via corresponding controls for each of the network address and link address overwrite parameters.

Each of the additional check boxes 504b and 504c include similar fields, so their descriptions are not repeated here. Check box 504b provides for overriding a source network address (e.g. Internet Protocol (IP) address) of a device highlighted or selected in the device list box 502. The check box 504c provides for overriding of a link level source address (e.g. source station address) of the device selected or highlighted in the device list box 502.

The user interface 500 also provides for specifying one or more criterion (criteria) that must be met before the override specified by the user interface 500 is put into effect. The criteria specified may refer to a time of day and/or date range, or may apply to characteristics of a particular packet to which the overwrite data is to be applied. One or more criterion for a source SAP, network address, or link address are specified by selecting a control included on the user interface 500. An example control 512a is shown with respect to a source sap selected via check box 504a. Each of the network address, selected via check box 504b and/or link address, selected via check box 504c, override information may also specify one or more criterion via separate controls 512b and 512c respectively. Example criteria are described below with respect to FIG. 6.

Note that while example user interface 500 illustrates an ability to configure overwrite values for a single network address (e.g. via 504b), link address (e.g. via 504c, etc), and SAP (e.g. via check box 504a), other embodiments may provide for configuration of overwriting of other parameters. For example, some embodiments may provide for overwriting of one or more of source and/or destination SAPs, source and/or destination network addresses, and/or source and/or destination link level addresses.

Figure 5B:
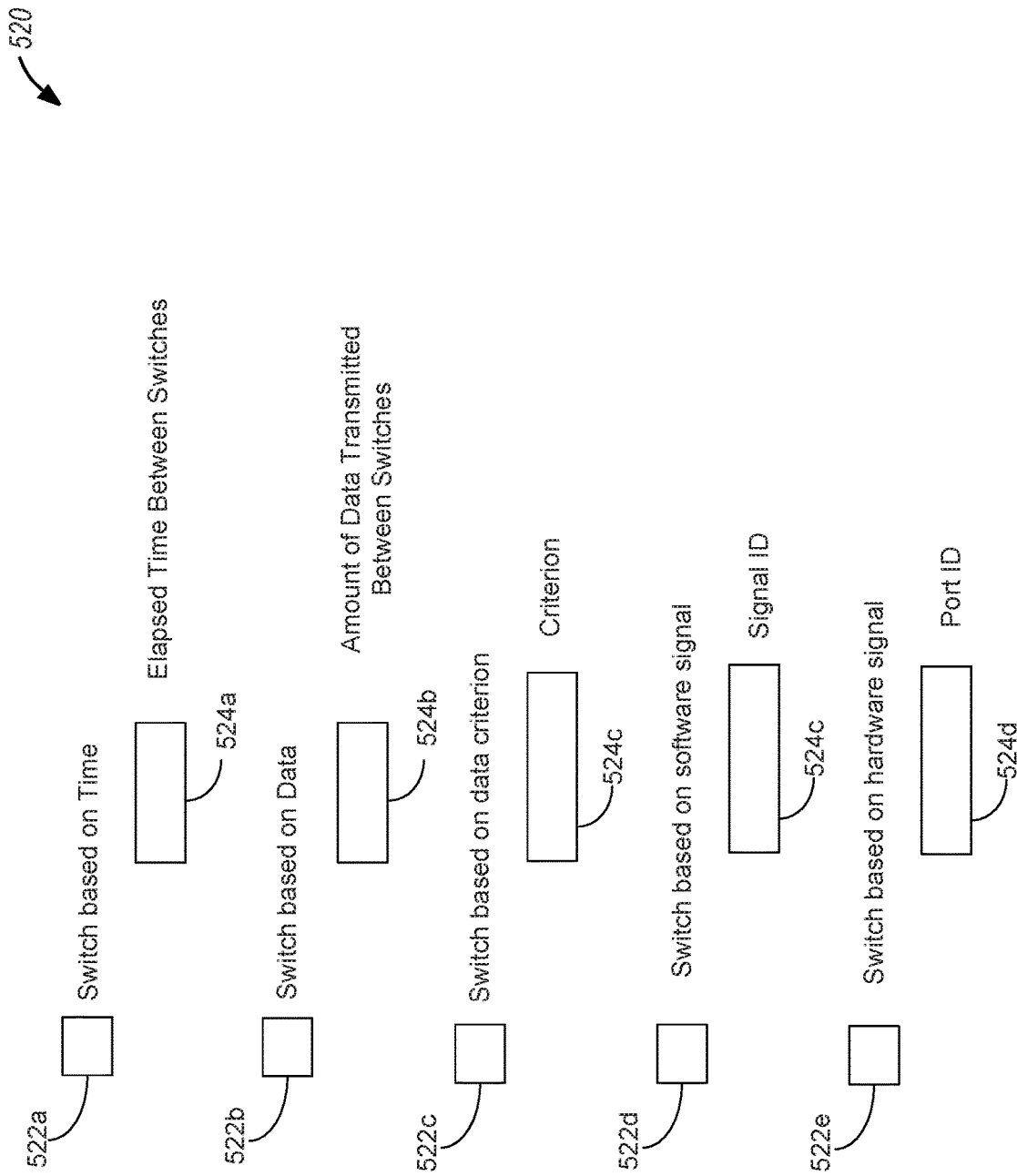
FIG. 5B shows an example user interface that is implemented in one or more of the disclosed embodiments.

FIG. 5B shows an example user interface that is implemented in one or more of the disclosed embodiments. The user interface 520 shown in FIG. 5B is displayed, by some embodiments, upon selection of any one or more of controls 514a-c, discussed above with respect to FIG. 5A. The user interface 500 provides for configuration of switching parameters relating to the SAP, network, or link level override being configured via user interface 500, discussed above (e.g. via selection of one of controls 514a-c respectively).

User interface 520 includes five check box controls 522a, 522b, 522c, 522d, and 522e. Selection of check box control 522a defines parameters that switch overwrite values based on an elapsed time. In other words, selection of check box control 522a provides for switching of overwrite parameters at a periodic frequency specified by the user interface 520. When user interface 520 is displayed in response to selection of switching control 514a, periodic switching of SAP parameters are defined. When user interface 520 is displayed in response to selection of switching control 514b, periodic switching of network level parameter(s) are defined by the user interface 520. When user interface 520 is displayed in response to selection of switching control 514c, periodic switching of link level parameter(s) are defined by the user interface 520. The elapsed time between switches is defined via edit box 524a. For example, the edit box 524a is configured, in some embodiments, to receive data specifying an elapsed time in milliseconds, microseconds, seconds, or minutes. Thus, if in some embodiments, user interface 500 specifies switching of a source SAP parameter within a range (e.g. via 508a-b), and the user interface 520, upon selection of switch control 514a, defines switching based on time (via check box control 522a) with edit box 524a indicating an elapsed time of one second, then some of the disclosed embodiments will overwrite a source SAP field of outgoing messages with a different SAP every one second. In other words, a constant source SAP value will be used for a first elapsed time period specified by edit box 524a (e.g. one second), and then a different source SAP value will be used for the next defined time period (e.g. one second) after that, and so on.

Selection of check box control 522b provides for switching of overwrite values based on an amount of data transmitted. The amount of data transmitted between switches is specified via edit box 524b. Thus, for example, in embodiments implementing this feature, a count of an amount of data transmitted is maintained. When the count transgresses a threshold defined by the edit box 524b, an overridden value is switched from a first value to a second value. The count is then reset and the process repeats.

The switching of overwritten values when check box control 522b is selected operates in a similar manner as described above with respect to check box control 522a, except the switch is caused by an amount of data transmitted between switching reaching a threshold amount specified by edit box 524b.

Selection of check box control 522c provides for switching of overwrite values based on one or more criterion being met. The one or more criterion is specified via edit box 524c. The switching of overwrite values when check box control 522c is selected operates in a similar manner as described above with respect to check box control 522a, except the switch is caused by the criterion specified by edit box 524c being met. In some embodiments, the switching based on time and/or amount of data as described above may also be accomplished via criterion specified in the edit box 524c.

The criterion may relate to values of data transmitted or any other data accessible to a device implementing disclosed embodiments In some aspects, a regular expression can be provided in the edit box 524c to define criterion that trigger a switch of overwrite parameter values.

Selection of check box control 522d provides for switching overwrite values based on reception of a software signal. Example user interface 520 shows that a signal identifier is provided in some embodiments via edit box 524c. For example, POSIX type signals are used to trigger a switch of overwrite values in some embodiments. Otherwise, switching via signals via check box control 522d operates in a similar manner as other methods of switching described above.

Selection of check box control 522e provides for switching overwrite values based on reception of a hardware-based signal. For example, as discussed above with respect to FIG. 1A and FIG. 1B, some embodiments provide for one or more hardware ports that may receive a signal from an external device, such as an FPGA or other hardware. Example user interface 520 provides an ability to specify a hardware port identifier via edit box 524d.

Figure 6:
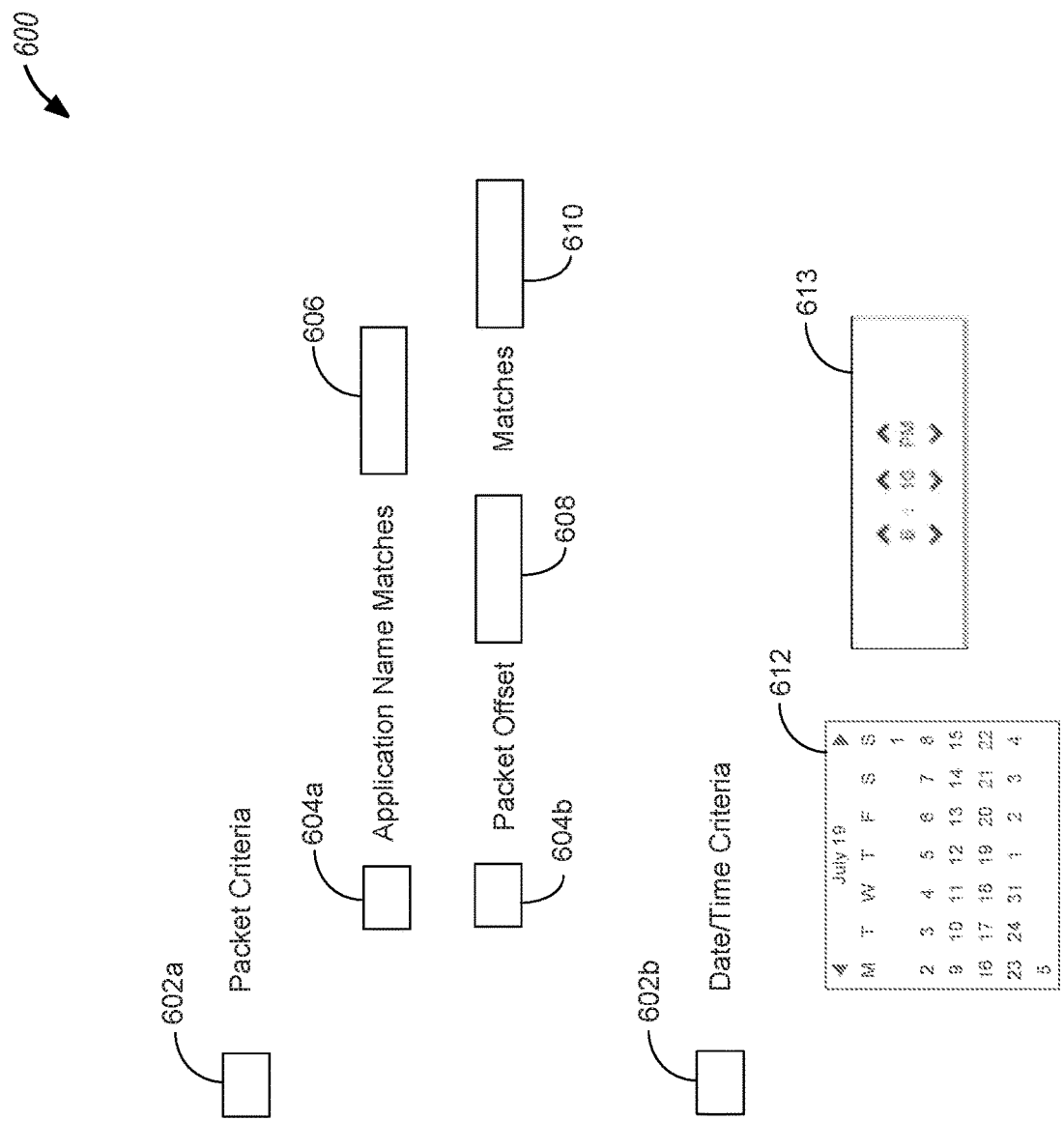
FIG. 6 shows an example user interface that is implemented by one or more of the disclosed embodiments.

FIG. 6 shows an example user interface 600 that is implemented by one or more of the disclosed embodiments. The user interface 600 defines criteria that when satisfied, provide for overwriting of network parameters as discussed above. For example, when criteria specified by the user interface 600 are met, the disclosed embodiments may overwrite one or more of the source SAP, source network address, and/or source link address.

User interface 600 provides for packet-based criteria (via check box 602a) and time/date-based criteria (via check box 602b). The packet-based criteria may provide for comparisons of a name of a process or application generating the packet via check box 604a. The comparison of the application name or process is performed against a string or regular expression (specified in edit box 606). The packet-based criteria also provide for a comparison at a particular offset within the packet via check box 604b. An offset within the packet for the comparison is specified via edit box 608. A value to compare against the packet value found at the offset is specified via edit box 610.

Time/date-based criteria are specified via selection of check box 602b in some embodiments. User interface 600 includes a calendar control 612 that provides for specifying a date range of when the criteria is met. Additional embodiments may provide for specifying a time of day range when the criteria are met, for example, via time picker control 613 shown in FIG. 6. The time of day/date range criterion is in addition to, or in alternative to, the packet criterion in various embodiments.

Figure 7A:
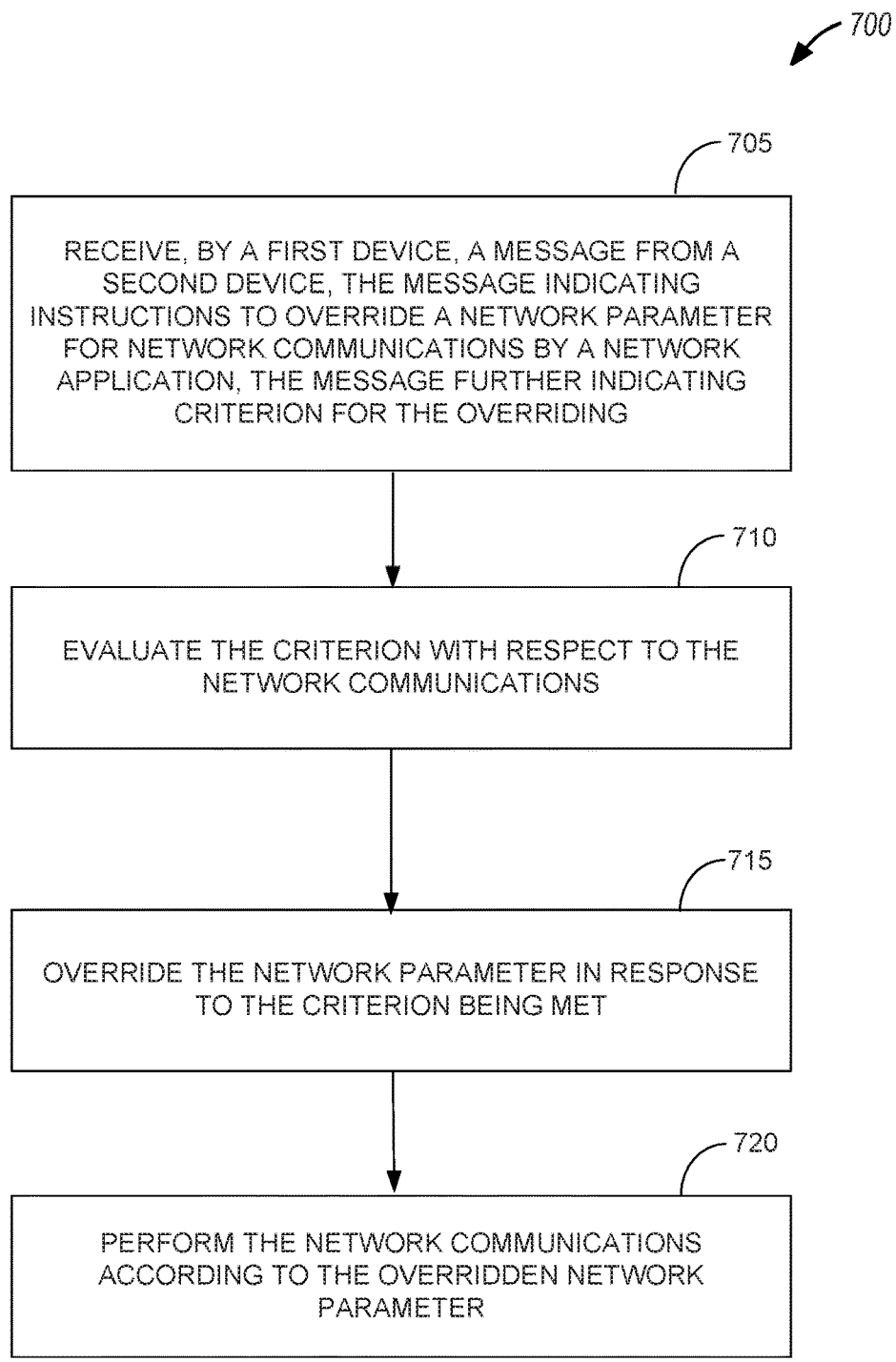
FIG. 7A is a flowchart of a process for overriding a network parameter.

FIG. 7A is a flowchart of a process for overriding a network parameter. In some aspects, one or more of the functions discussed below with respect to FIG. 7A is performed by a source device (e.g., any of 102a-c or 152a-c), or by instructions stored in the control channel manager 202, discussed above with respect to FIG. 2. In some aspects, one or more of the functions discussed below with respect to FIG. 7A and the process 700 are performed by hardware processing circuitry (e.g., processor 902 discussed below). In some of these aspects, instructions (e.g., instructions 924 discussed below) stored in a memory (e.g., memory 904 discussed below) configure the hardware processing circuitry to perform one or more of the functions discussed below with respect to FIG. 7A and the process 700.

In operation 705, a message is received by a first device. In some aspects, the first device is a source device (e.g., any of 102a-c or 152a-c). In some embodiments, the message is received via a shared memory, such as the shared memory 105 discussed above with respect to FIG. 1A. In some aspects, receiving a message may include polling a mailbox to detect a message is available in the mailbox. For example, in some aspects, a source device (e.g., any of 102a-c) may poll a mailbox (e.g., any of 106a-c) to identify when a message is available (e.g., via message indicator 302). In some aspects, a communications interface of a device performing the process 700 may receive an interrupt when a message is made available in the mailbox. In these aspects, operation 705 is performed in response to receiving such an interrupt.

In some other embodiments, the message is received from the WNAC 158 via a wireless network. In some embodiments, the message received in operation 705 may include one or more of the fields of the example message 400 discussed above with respect to FIG. 4.

In some embodiments, the message is encrypted when received and is decrypted by operation 705 before being decoded. For example, in some embodiments, a block cipher encryption is employed on the message (e.g. Advanced Encryption Standard (AES) or Triple Data Standard Encryption (DES)).

Once the message has been decrypted or is otherwise available for decoding, in some embodiments, the message is decoded to identify an identifier that is predetermined to identify a particular network parameter. In some embodiments, the particular network parameter is a source address to be used as an address that identifies the first device in a network message transmitted by the first device. The network parameter includes one or more of a transport-level source port number, a source network address (e.g., IP address), or a link level address (e.g., an Ethernet station address). The message also includes a value to use to override the identified network parameter. In some embodiments, the message includes one or more criterion (e.g., criteria) that must be met before the specified network parameter is overridden. The one or more criterion may relate to conditions of a network communication subject to an override. For example, the criterion may evaluate whether a network communication is destined to a particular device or a particular set of addresses (including a single address), a type of transmission of the network communication (e.g., is it unicast, multicast, or broadcast), a source port of the communication, a type of transport protocol used for the communication (e.g., TCP or UDP, etc.), a name of a network application generating the network communication, a number of network packets or network messages generated within a specified time period, a CPU utilization of the first device, or other conditions of the network communication.

Note that in some embodiments, operation 705 is preceded by the first device broadcasting a status message identifying itself. For example, as discussed above with respect to FIG. 1B, some embodiments provide communication between the WNAC 158 and a source node or source device via a wireless network. In order for the WNAC 158 to discover source nodes accessible via the wireless network, in some embodiments, the source nodes broadcast messages indicating their presence. The broadcast messages include, in various embodiments, one or more of a source address of the broadcasting node, and one or more indicators of capabilities of the source node. For example, if the source node is configured to dynamically modify one or more addressed used by the source node during network communication, the broadcast message is generated, at least in some embodiments, to indicate this information.

In operation 710, the criterion is evaluated with respect to the network communication. For example, operation 710 may evaluate the criterion with respect to each network packet or network message generated by a network protocol stack (e.g., network protocol stack 203) of the first device.

In operation 715, the specified network parameter is overridden in response to the one or more criterion being met. Overriding the network parameter may include intercepting a network packet or network message generated by the first device, and modifying the network parameter included in the network message or network packet in accordance with the instructions received in operation 705. For example, as discussed above, various network parameters included in a network packet or network message generated by the first device may have an initial or "default" value. These default values may result from nominal operation of the source device. As one example embodiment, the first device is assigned a source network address, such as an IP address. In some embodiments, this source network address is stored in configuration data on the source device and is used by default for network messages and/or packets generated by the first device. The configuration data is set by a network administrator, for example, via a configuration user interface or via a configuration file in at least some embodiments. In some embodiments, a source IP address is assigned to the first device by a configuration protocol, such as the dynamic host configuration protocol (DHCP). In some embodiments, the network parameter (such as a source network address) is specified by a network application (e.g., network application 204a via control method(s) 208a and sockets layer 204b (e.g. sockets API/library)).

The message received in operation 705 may specify an alternate source network address that is used to override the default source network address provided via one of the default methods described above. Operation 715 operates similarly for other types of network parameters, such as transport level source ports (e.g., UDP source port) or link level addresses (e.g., an Ethernet station address). These network parameters also have default values that result from nominal operation of the source device (e.g., any of 102a-c or 152a-c) and/or network protocol stack (e.g., network protocol stack 203). In some embodiments, these default values are specified by the network application (e.g., network application 204a via control method(s) 208a), or via configuration parameters. In some embodiments, these default values are similarly overridden by instructions received from the shared memory (e.g., shared memory 105) or based on a message received from the WNAC 158 via a wireless network.

In operation 720, the network communication is performed according to the overridden network parameter. In some aspects, operation 720 includes configuring the first device to transmit the intercepted network message and/or network packet that includes the overridden parameter value.

In some aspects of the process 700, an evaluation of one or more second criterion received in a second message indicates that the second one or more criterion are not met for one or more network messages and/or network packets. In this case, the process 700 inhibits any overriding of network parameters associated with the second criterion and allows those network messages and/or packets to be nominally transmitted by the first device.

Figure 7B:
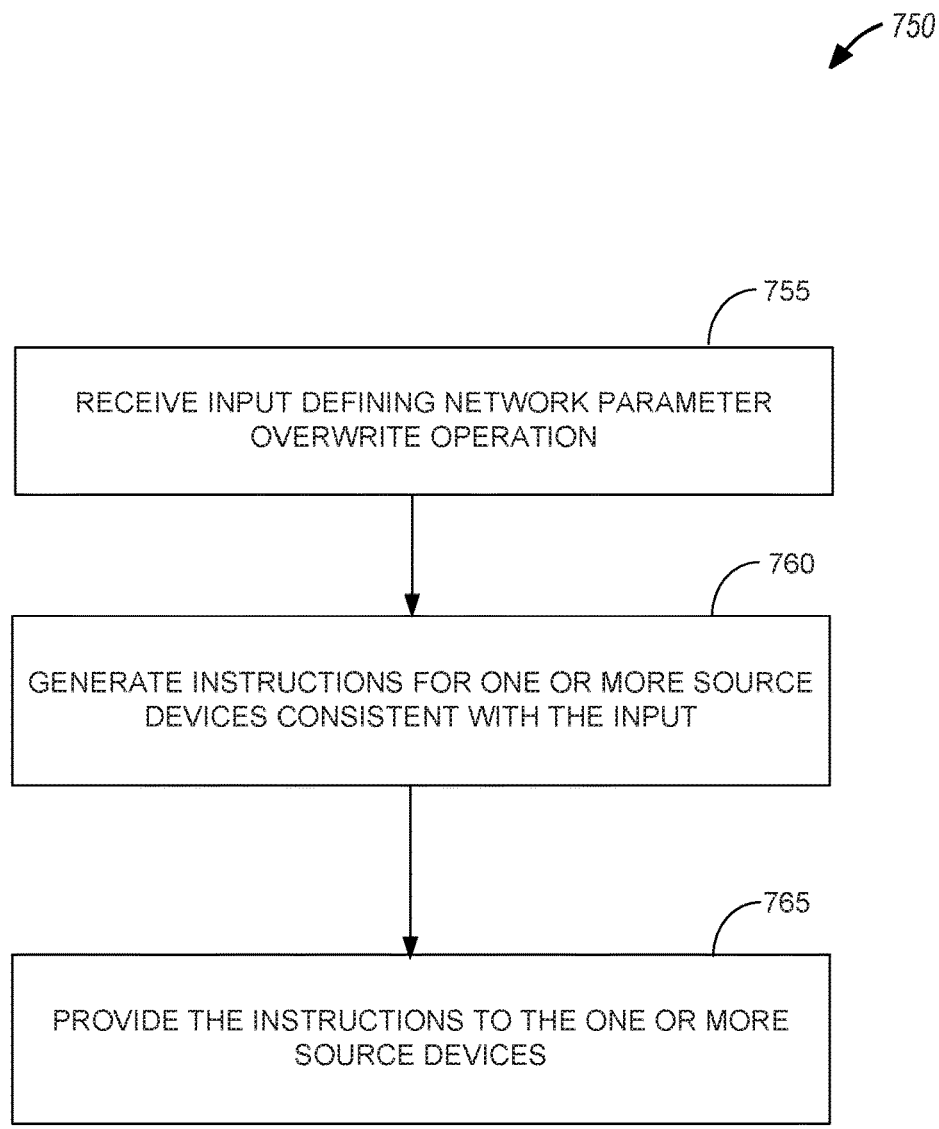
FIG. 7B is a flowchart of a process for overriding a network parameter.

FIG. 7B is a flowchart of a process for overriding a network parameter. In some aspects, one or more of the functions discussed below with respect to FIG. 7B are performed by a controller device (e.g., any of controller device 107 or 157), or by instructions stored in the alternate channel controller 108 or WNAC 158. In some aspects, one or more of the functions discussed below with respect to FIG. 7B and the process 750 are performed by hardware processing circuitry (e.g., processor 902 discussed below). In some of these aspects, instructions (e.g., instructions 924 discussed below) stored in a memory (e.g., memory 904 discussed below) configure the hardware processing circuitry to perform one or more of the functions discussed below with respect to FIG. 7B and the process 750.

In operation 755, input is received that defines network parameter overwrite operation. In some embodiments, the network parameter is a source address network parameter. As discussed above for example with respect to FIG. 5A-6, some embodiments cause display of any of the user interfaces 500, 520, or 600 to obtain input that defines how network parameters for one or more source devices are to be overwritten. Thus, operation 755 includes, in various embodiments, display of a user interface including one or more of the features of the user interfaces 500, 520, or 600 and reception of input defining one or more overwrite parameters defined by those user interfaces. Some embodiments may use a less sophisticated user interface than the examples described above with respect to FIGS. 5A-6. For example, some embodiments may utilize a configuration file on a controller device (e.g. controller device 107 or controller device 157) that defines the network parameter overwrite operation.

Operation 760 generates instructions for one or more source devices consistent with the input received in operation 755. For example, if the input indicates that a source SAP, network address, or link address is to be overwritten, then the instructions are generated to indicate that a source SAP, network address, or link address are to be overwritten by the source node receiving the instructions. Furthermore, if the input indicates use of an address range, the generated instructions similarly indicate use of an address range by the source node receiving the instructions. If the input indicates use of a criterion to evaluate before overwriting the indicated address(es), then the instructions are similarly generated to indicate use of the criterion (e.g. via field 402 of message 400 in some embodiments).

Operation 765 provides the instructions to the one or more source devices. As discussed above, some embodiment utilize a shared memory interface between a controller device and one or more source devices. Thus, in these embodiments, operation 765 includes sending the instructions to the one or more source devices via a shared memory. In some embodiments, the instructions are sent via a message including one or more of the fields discussed above with respect to message 400 of FIG. 4.

In embodiments utilizing a WNAC, and communicating with source nodes via a wireless network, providing the instructions includes transmitting one or more messages over the wireless network to the one or more source nodes/devices. For example, one or more messages including one or more of the fields of example message 400 discussed above with respect to FIG. 4 are transmitted over the wireless network to provide instructions to one or more source nodes consistent with the input received in operation 755.

Figure 8A:
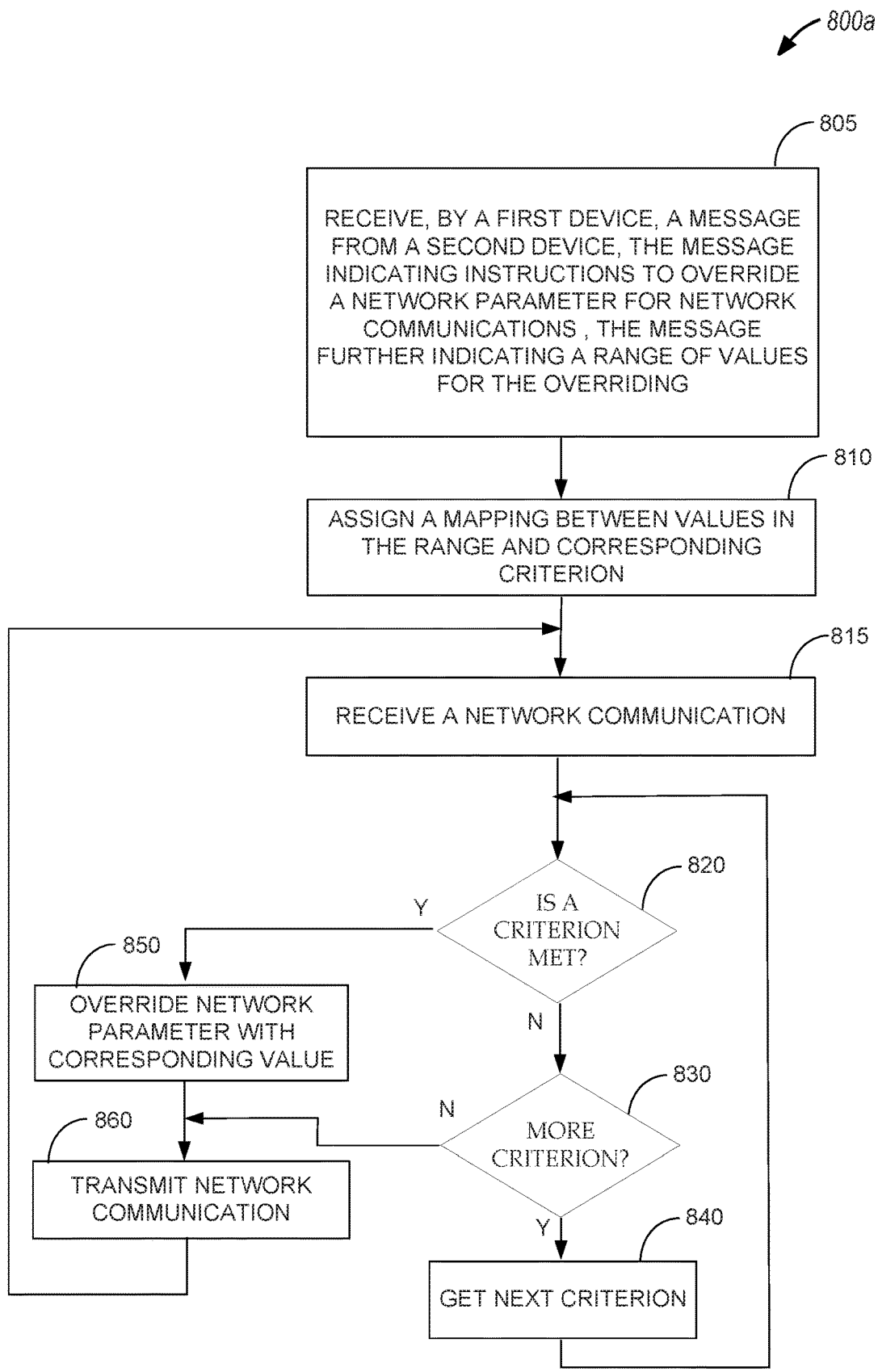
FIG. 8A is a flowchart of an example method that is implemented in one or more of the disclosed embodiments.

FIG. 8A is a flowchart of an example method implemented in one or more of the disclosed embodiments. In some embodiments, one or more of the functions discussed below with respect to FIG. 8A are performed by hardware processing circuitry (e.g., processor 902 discussed below). In some of these embodiments, one or more electronic hardware memories (e.g., 904 discussed below) stores instructions (e.g., 924 discussed below) that when executed, configure the hardware processing circuitry to perform the one or more functions of process 800a discussed below. In some embodiments, the second device described below with respect to FIG. 8A is a device executing the alternate channel controller 108 (e.g. controller device 107). In some of these aspects, the first device discussed below is a source node or source device (e.g. any of 102a-c or 152a-c).

In operation 805, instructions are received. In some embodiments, the instructions are received from a shared memory (e.g. the shared memory 105). In other embodiments, the instructions are received via a network message from the WNAC 158. The instructions are included in a message that is received by a first device from a second device via either the shared memory (e.g., 105) or a wireless network (e.g. from the WNAC 158). The first device may, in some embodiments, be any one of the source devices 102a-c discussed above with respect to FIGS. 1A and/or 2 or the source devices 152a-c of FIG. 1B. The second device in some embodiments runs the alternate channel controller 108 discussed above with respect to FIG. 1A. In some embodiments, the second device executes the WNAC 158 of FIG. 1B.

In embodiments utilizing a shared memory for communication, the second device writes one or more messages to the shared memory (e.g., 105) instructing the first device (e.g., a source node 102a-c) to override one or more network parameters, as discussed above. In some embodiments, the shared memory is organized as described above with respect to FIG. 3. In other embodiments, the second device communicates control information to the first device via network messages communicated over a wireless network (e.g. in embodiments implementing a WNAC 158). The control information indicates that the first device is to override one or more network parameters, as discussed above. In some embodiments, one or more messages passed from the second device to the first device substantially conform, or include one or more of the data items discussed above with respect to FIG. 4.

The network parameters indicated for overwrite, in at least some embodiments, are source addresses or source address ranges. The source address or source address ranges identify, in at least some embodiments, the first device in a network communication transmitted by the first device.

In the embodiment described by FIG. 8A, the second device passes a network parameter range to the first device. The network parameter range indicates a range of network parameter values the first device is to use when overriding the network parameter specified in the message (e.g., via a predetermined value, indicating a network parameter such as a transport level source SAP (e.g., UDP SAP), source network address (e.g., IP address), or source station address (e.g., Ethernet address)). The instructions indicate the first device is to override a particular network parameter using values selected from the range. In some embodiments, the values within the range are randomly selected by the first device when overriding the network parameter. In some other embodiments, the values are sequentially selected (with a return to a lowest ordered value after the highest value selected value is selected).

In operation 810, a mapping between values within the range and separate one or more criterion is determined or assigned. In some aspects, the mapping is included or otherwise indicated in the received message of operation 805. In some aspects, the first device determines the mapping. The one or more criterion for each value identifies a particular type of network message or packet to which the network parameter value is to be applied. For example, in some aspects, different criterion may identify different network applications. In these aspects, different network parameter values are then applied to network messages or packets generated by different network applications. In some other aspects, different criterion may identify network messages or network packets using different transport level protocols. For example, in some aspects, TCP messages are overridden with a first value for a source network address or source link level address, while UDP messages are overridden with a second value for a source network address or source link level address. In some other aspects, the criterion may identify different source ports. Then different override values are applied to network messages or packets having the different source ports. Any of these examples may also be combined such that the one or more criterion evaluates multiple conditions for each network message or network packet before determining a network parameter override value. In some aspects, the criterion is structured such that process 800a performs time division multiplexing across multiple different source network addresses or source link level addresses. In these embodiments, a single source device (e.g., any of 102a-c or 152a-c) may appear on the network to be 10, 20, 50, or even 100 different devices (based on the use of different link level and/or network level source addresses).

In operation 815, a network communication is received. The network communication is generated by a network application executing on the first device (e.g., network application 204a). The network communication is a network message or a network packet in some embodiments. The network message or packet is sent by the network application via a data path (e.g., data method(s) 208b) of a network protocol stack (e.g., network protocol stack 203) in some embodiments. In some aspects, the network communication is received in operation 815 by intercepting a data path between two components of the protocol stack. For example, the network communication is intercepted at any of data method(s) 208b, 210b, 212b, 214b, 216b in at least some embodiments.

In decision operation 820, a criterion is evaluated against the network communication (e.g., network message and/or network packet). The criterion is one of the criteria included in the mapping of operation 810. If the criterion as applied to the network communication is not met, process 800a moves from decision operation 820 to decision operation 830, which determines if there are additional criterion to evaluate. If there are no further criterion to evaluate, process 800a moves from decision operation 830 to operation 860, which transmits the network communication. Transmitting the network communication may include passing the network communication to a level of a network protocol stack below where the network communication was intercepted. For example, in embodiments intercepting the network communication at data path 212b, between the transport layer 204c and the network layer 204d, then operation 860 includes passing the network communication to the network layer 204d. After the network communication is transmitted in operation 860, processing returns to operation 815 where another network communication is received and processing repeats.

Returning to the discussion of decision operation 830, if there were more criterion to evaluate, process 800a moves from decision operation 830 to operation 840, which obtains the next criterion. The next criterion is identified from the mapping of operation 810 in some aspects. Processing then returns to decision operation 820, which evaluates the next criterion.

Returning to the discussion of decision operation 820, if a criterion is met, process 800a moves to operation 850. Operation 850 determines a network parameter value mapped to the met criterion of decision operation 820. The parameter value is identified per mapping of operation 810. The network parameter value is then applied to the network communication by overriding the network parameter with the corresponding value.

Figure 8B:
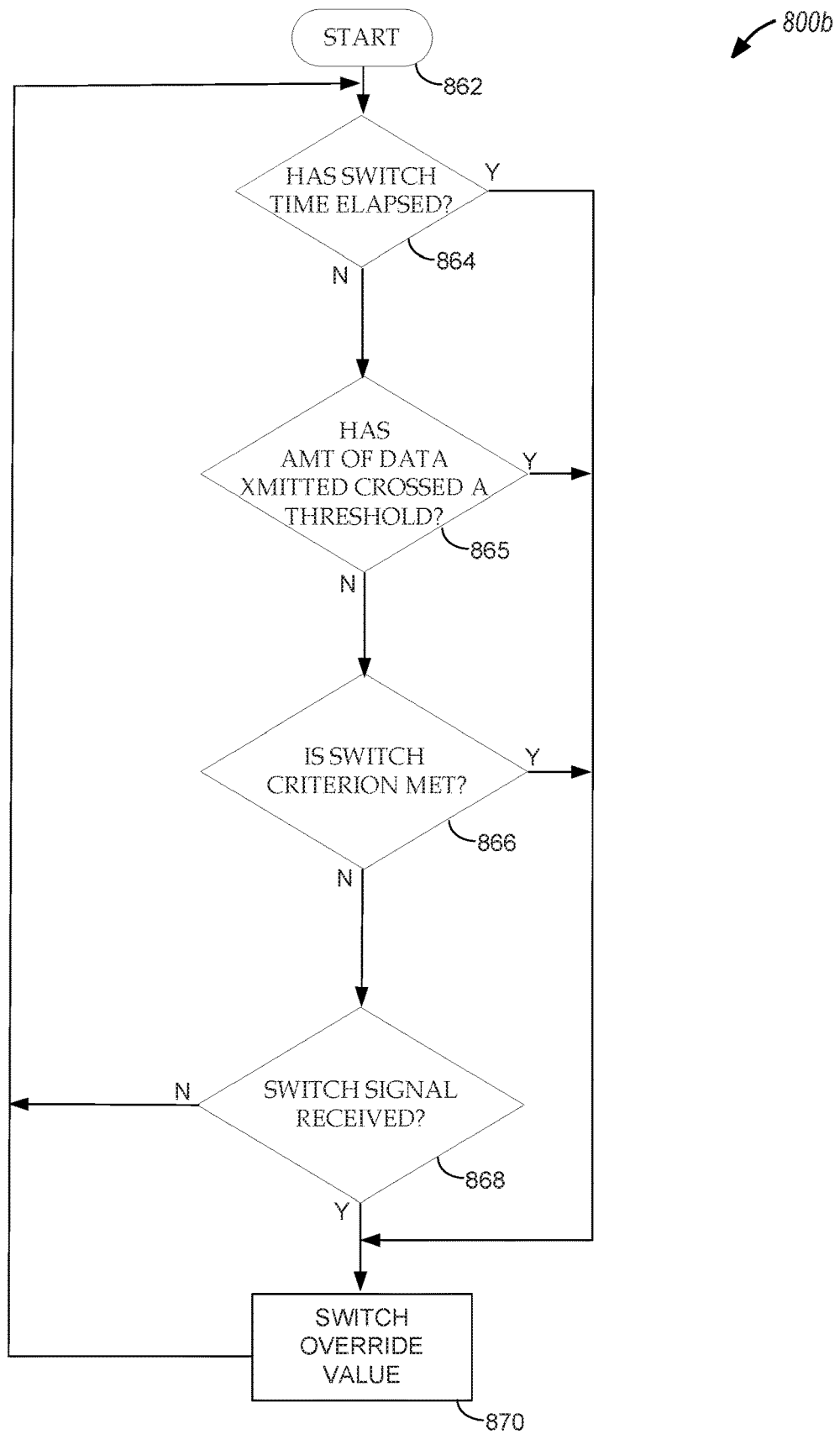
FIG. 8B is a flowchart of an example method that is implemented in one or more of the disclosed embodiments.

FIG. 8B is a flowchart of an example method implemented in one or more of the disclosed embodiments. In some embodiments, one or more of the functions discussed below with respect to FIG. 8B are performed by hardware processing circuitry (e.g., processor 902 discussed below). In some of these embodiments, one or more electronic hardware memories (e.g., 904 discussed below) stores instructions (e.g., 924 discussed below) that when executed, configure the hardware processing circuitry to perform the one or more functions of process 800b discussed below. In some embodiments, the first device described below with respect to FIG. 8B is a device executing the control channel manager 202 (e.g. any of source nodes 102a-c or 152a-c) In some of these aspects, the second device discussed below is the controller device 107 running the alternate channel controller 108 or the controller device 157 running the WNAC 158. In some embodiments, operation 860, discussed above, performs one or more of the functions of process 800b, discussed below.

After start operation 862, process 800b moves to decision operation 864 which determines whether a switch time has elapsed. For example, decision operation 864 may consider parameters set via user interface 520, such as check box control 522a and/or edit box 524a. In some embodiments, decision operation 864 first considers whether switching via elapsed time is enabled or not (e.g. via check box control 522a in some embodiments). If switching via elapsed time is enabled, some embodiments then compare an elapsed time since a previous switch to a threshold amount of time (e.g. indicated by edit box 524a in some embodiments). If the elapsed time has elapsed, process 800b moves from decision operation 864 to operation 870, discussed below. If the elapsed time has not elapsed, or switching based on elapsed time is not enabled, process 800b moves to decision operation 865

Decision operation 865 evaluates whether an amount of data transmitted has reached or otherwise transgressed a data threshold. In some embodiments, decision operation 865 first determines whether switching based on an amount of data is enabled (e.g. via check box control 522b in some embodiments). If switching based on data amount is enabled, then an amount of data transmitted since a previous switch or initial overwrite of a parameter has reached a data threshold (e.g. such as a data threshold specified via 524b in some embodiments). If the amount of data transmitted has reached or transgressed the data threshold, then the decision operation 865 moves to operation 870, discussed below. Otherwise, process 800b moves from decision operation 865 to decision operation 866.

Decision operation 866 evaluates whether one or more switching criterion is met. As discussed above with respect to user interface 520, switching criterion is specified, for example, via a regular expression which is applied to data to be transmitted (e.g. via edit box 524c in some embodiments). If the one or more criterion is met, process 800b moves from decision operation 866 to operation 870, discussed below. Otherwise, process 800b moves from decision operation 866 to decision operation 868, which determines whether a signal has been received that indicates a switch in an overwrite parameter. For example, as discussed above with respect to user interface 520, some embodiments provide for specification of one or more of a software generated signal (such as a PO SIX signal) (e.g. via selection of check box control 522d and specification of a specific signal via edit box 524c in some embodiments). Some embodiments provide for specification/configuration of a hardware signal, such as a signal received over a particular hardware port (e.g. via selection of check box control 522e and/or specification of a port identification via edit box 524d in some embodiments). If a specified/configured signal has been received, process 800b moves from decision operation 868 to operation 870. Otherwise, process 800b moves from decision operation 868 back to decision operation 865 and process 800b may iterate.

Operation 870 then switches an overwrite value. For example, the overwrite value is for any of the parameters discussed above, such as source/destination SAPs, source/destination network addresses, source/destination link level addresses, or any other network parameter. Switching switches from a first value to a second value. The switch performed in operation 870 is, in some embodiments, in conformance with a overwrite value selection methods specified for the network parameter. For example, as discussed above with respect to user interface 500, an overwrite operation is specified to use a random value or to select a value from a range of values in at least some embodiments. Thus, operation 870 switches from a first value to a second value consistent with the configured/specified method. Thus, if random determination of an overwrite value has been configured/specified (e.g. via 506a), then operation 870 generates a new random value and uses the new random value as the second value. If selection from a range has been configured/specified (e.g. via 506b), then operation 870 selects a new value from the identified range and uses that value as the second value. In some aspects, when a range of values has been configured/specified, operation 870 iterates through the range sequentially. In other embodiments, operation 870 selects a random value from the range, but ensures the same value is not used twice until all values have been used within at least a switching cycle.

Note that process 800b may operate for each overwritten network parameter. Thus, in the example UI of FIG. 5A, process 800b may operate for each of an overwritten link address, network address, and/or SAP.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and is configured or arranged in a certain manner. In example embodiments, one or more computer systems (e.g., a standalone, client or server computer system) or one or more processors are configured by software (e.g., an application or application portion) as a hardware-implemented module that operates to perform certain operations as described herein.

In various embodiments, a hardware-implemented module is implemented mechanically or electronically. For example, a hardware-implemented module may comprise dedicated circuitry or logic that is permanently configured to perform certain operations (e.g., as a special-purpose processor, such as a field programmable gate array (FPGA) or an application-specific integrated circuit (ASIC)). A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software is driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor is configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules are regarded as being communicatively coupled in at least some embodiments. Where multiple of such hardware-implemented modules exist contemporaneously, communications are achieved through signal transmission (e.g., over appropriate circuits and buses) that connect the hardware-implemented modules. In embodiments in which multiple hardware-implemented modules are configured or instantiated at different times, communications between such hardware-implemented modules is achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein are performed, in at least some embodiments, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein are at least partially processor-implemented in some embodiments. For example, at least some of the operations of a method are performed, in at least some embodiments, by one or processors or processor-implemented modules. The performance of certain operations are distributed, in at least some embodiments, among the one or more processors, not only residing within a single machine, but deployed across a number of machines. In some example embodiments, the processor or processors are located in a single location (e.g., within a home environment, an office environment or as a server farm), while in other embodiments the processors are distributed across a number of locations.

The one or more processors may also operate to support performance of the relevant operations in a "cloud computing" environment or as a "software as a service" (SaaS). For example, at least some of the operations are performed, in at least some embodiments, by a group of computers (as examples of machines including processors), these operations being accessible via a network (e.g., the Internet) and via one or more appropriate interfaces (e.g., Application Program Interfaces (APIs)). In some embodiments, the one or more processors may operate to support performance of disclosed embodiments in a real-time timing constrained system. For example, a group of computers with deterministic timing are used to implement one or more of the disclosed embodiments.

Example embodiments are implemented in digital electronic circuitry, or in computer hardware, firmware, software, or in combinations of them. Example embodiments are implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program is written in any form of programming language, including compiled or interpreted languages, and it is deployed, in at least some embodiments, in any form, including as a stand-alone program or as a module, subroutine, or other unit suitable for use in a computing environment. In some embodiments, a computer program is deployed to be executed on one computer or on multiple computers at one site or distributed across multiple sites and interconnected by a communication network.

In example embodiments, operations are performed by one or more programmable processors executing a computer program to perform functions by operating on input data and generating output. Method operations may also be performed by, and apparatus of example embodiments are implemented as, special purpose logic circuitry (e.g., a FPGA or an ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware is a design choice. Below are set out hardware (e.g., machine) and software architectures that are deployed in various example embodiments.

Figure 9:
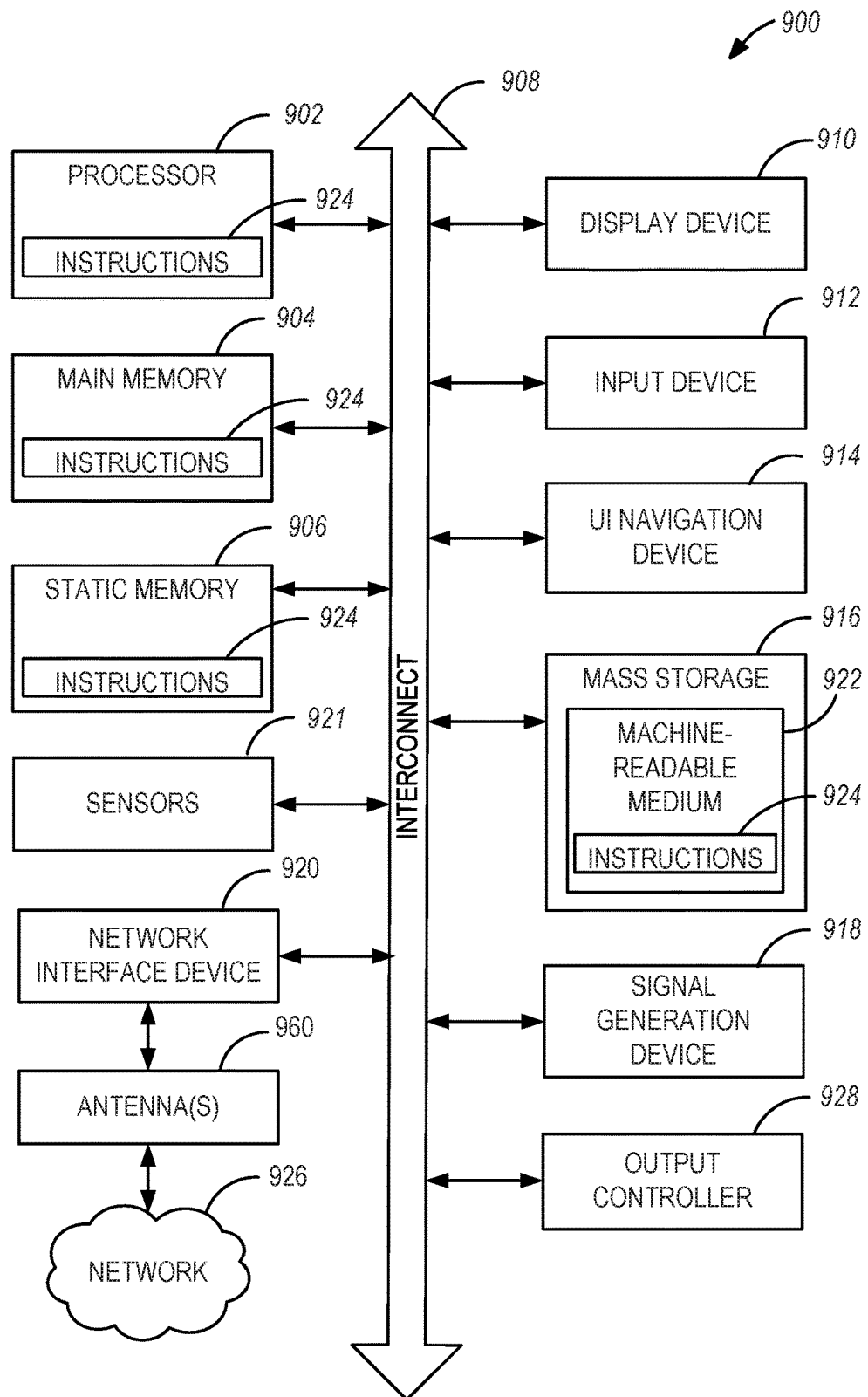
FIG. 9 illustrates, by way of example, a block diagram of an embodiment of a processing system on which one or more of the processes discussed herein, can be implemented.

FIG. 9 illustrates, by way of example, a block diagram of an embodiment of a system 900 on which one or more of the processes discussed herein, can be implemented. In these embodiments, any one of the source nodes 102a-c or 152a-c are implemented by the system 900. In at least some of these embodiments, a non-transitory computer-readable storage medium 922 is configured to store instructions 924 for execution by processing circuitry 902 of a source node (e.g. any of 102a-c or 152a-c) to communicate with a target node (e.g. any of 104a-f or 154a-f).

In some embodiments, the system 900 may also include one or more sensors 921, such as a global positioning system (GPS) sensor, a compass, and/or an accelerometer. In some embodiments, the system 900 may include an output controller 928, such as a serial (e.g., universal serial bus (USB)), a parallel, or other wired or wireless (e.g., infrared (IR), near field communication (NFC), etc.) controller.

In alternative embodiments, the system 900 operates as a standalone device or is connected (e.g., networked) to other machines. In a networked deployment, the machine may operate in the capacity of a server or a client machine in server-client network environment, or as a peer machine in a peer-to-peer (or distributed) network environment. The machine is, in some embodiments, a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 900 includes a processor or processing circuitry 902 (e.g., a central processing unit (CPU), a graphics processing unit (GPU) or both), a main memory 904 and a static memory 906, which communicate with each other and other system components via a bus 908. The system 900 may further include a video display unit 910 (e.g., a liquid crystal display (LCD) or a cathode ray tube (CRT)). The system 900 also includes an alphanumeric input device 912 (e.g., a keyboard), a user interface (UI) navigation device 914 (e.g., a mouse), a mass storage unit 916, a signal generation device 918 (e.g., a speaker), a network interface device 920, and radios or antennas 960 such as Bluetooth, WWAN, WLAN, and NFC, permitting the application of security controls on such protocols.

The mass storage unit 916 includes the machine-readable medium 922 on which is stored the one or more sets of instructions and data structures (e.g., software) 924 described above and embodying or utilized by any one or more of the methodologies or functions described herein. The instructions 924 may also reside, completely or at least partially, within the main memory 904, the static memory 906, and/or within the processor 902 during execution thereof by the system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 are transmitted, in at least some embodiments, using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, WLAN, LTE and 5G networks). The term "transmission medium" shall be taken to include any tangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes are made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter is practiced. The embodiments illustrated are described in sufficient detail to enable those skilled in the art to practice the teachings disclosed herein. Other embodiments are utilized and derived therefrom, such that structural and logical substitutions and changes made without departing from the scope of this disclosure. This Detailed Description, therefore, is not to be taken in a limiting sense, and the scope of various embodiments is defined only by the appended claims, along with the full range of equivalents to which such claims are entitled.

Example 1 is a first device configured to operate as a source node to transmit data to a target node, the first device comprising: processing circuitry; and a memory storing instructions that when executed configure the processing circuitry to perform network communications on behalf of a network application executing on the first device, the network communications configured, via one or more network parameters of a network protocol stack, for transmission to a target node, and the processing circuitry further configured by the stored instructions to: receive a message from a second device, the message indicating instructions for overriding a source address network parameter of the network parameters, the instructions further indicating a criterion; determine the criterion is met by a particular network communication of the network communications; override the source address network parameter of the particular network communication with an override value indicated in the message in response to the criterion being met; and transmit the particular network communication including the overridden source address network parameter to the target node.

In Example 2, the subject matter of Example 1 optionally includes a memory, the memory configured for access by the device and the second device, wherein the message from the second device is received via the memory.

In Example 3, the subject matter of any one or more of Examples 1-2 optionally include wherein the message is received from a wireless node array controller (WNAC) via wireless network.

In Example 4, the subject matter of any one or more of Examples 1-3 optionally include the processing circuitry further configured to: decode the message to identify an instruction to overwrite a transport level service access point (SAP) source port number with a first value; and override the transport level SAP source port number of the particular network communication with the first value in response to the criterion being met.

In Example 5, the subject matter of Example 4 optionally includes wherein the transport level service SAP source port number is a universal datagram protocol (UDP) source port number.

In Example 6, the subject matter of any one or more of Examples 4-5 optionally include the processing circuitry further configured to specify, via a network application, the transport level SAP source port number.

In Example 7, the subject matter of any one or more of Examples 1-6 optionally include the processing circuitry further configured to: decode the message to identify an instruction to override a link level source address of the network communications with an address selected from an indicated link level address range; select an address from the link level address range; and override the link level source address of the particular network communication with the selected address.

In Example 8, the subject matter of Example 7 optionally includes the processing circuitry further configured to: assign a plurality of link level addresses from the link level address range to a corresponding plurality of network application source ports; and perform time division multiplexing by transmitting packets having the network application source ports via the corresponding assigned link level addresses.

In Example 9, the subject matter of any one or more of Examples 1-8 optionally include the processing circuitry further configured to periodically switch the override value to a different value.

In Example 10, the subject matter of any one or more of Examples 1-9 optionally include the processing circuitry further configured to switch the override value in response to an amount of data transmitting transgressing a data threshold.

In Example 11, the subject matter of any one or more of Examples 1-10 optionally include the processing circuitry further configured to: decode the message to identify an instruction to override a network level source address of the network communications; and override a network level source address of the particular network communication with the instructed network level source address.

In Example 12, the subject matter of Example 11 optionally includes wherein the network level source address is an Internet Protocol (IP) address.

Example 13 is a method to transmit data to a target node, the method comprising: performing network communications on behalf of a network application executing on a communication device, the network communications configured, via one or more network parameters of a network protocol stack, for transmission to a target node; receiving a message from a device, the message indicating instructions for overriding a source address network parameter of the network parameters, the instructions further indicating a criterion; determining the criterion is met by a particular network communication of the network communications; overriding the source address network parameter of the particular network communication with an override value indicated in the message in response to the criterion being met; and transmitting the particular network communication including the overridden source address network parameter to the target node.

In Example 14, the subject matter of Example 13 optionally includes decoding the message to identify an instruction to overwrite a transport level service access point (SAP) source port number with a first value; and overriding the transport level SAP source port number of the particular network communication with the first value in response to the criterion being met.

In Example 15, the subject matter of any one or more of Examples 13-14 optionally include decoding the message to identify an instruction to override a link level source address of the network communications with an address selected from an indicated link level address range; selecting an address from the link level address range; and overriding the link level source address of the particular network communication with the selected address.

In Example 16, the subject matter of Example 15 optionally includes assigning a plurality of link level addresses from the link level address range to a corresponding plurality of network application source ports; and performing time division multiplexing by transmitting packets having the network application source ports via the corresponding assigned link level addresses.

In Example 17, the subject matter of any one or more of Examples 13-16 optionally include periodically switching the override value to a different value.

In Example 18, the subject matter of any one or more of Examples 13-17 optionally include switching the override value in response to an amount of data transmitting transgressing a data threshold.

In Example 19, the subject matter of any one or more of Examples 13-18 optionally include decoding the message to identify an instruction to override a network level source address of the network communications; and overriding a network level source address of the particular network communication with the instructed network level address.

Example 20 is a non-transitory computer readable storage medium comprising instructions that when executed configured hardware processing circuitry to perform operations comprising: performing network communications on behalf of a network application executing on a communication device, the network communications configured, via one or more network parameters of a network protocol stack, for transmission to a target node; receiving a message from a device, the message indicating instructions for overriding a source address network parameter of the network parameters, the instructions further indicating a criterion; determining the criterion is met by a particular network communication of the network communications; overriding the source address network parameter of the particular network communication with an override value indicated in the message in response to the criterion being met; and transmitting the particular network communication including the overridden source address network parameter to the target node.

What is claimed is:

1. A first device configured to operate as a source node to transmit data to a target node, the first device comprising:
   processing circuitry; and
   a memory storing instructions that when executed configure the processing circuitry to perform network communications on behalf of a network application executing on the first device, the network communications configured, via one or more network parameters of a network protocol stack, for transmission to the target node, and the processing circuitry further configured by the stored instructions to:
   receive a message from a second device, the message including an identifier of a source address network parameter of the one or more network parameters to override, a switch criterion identifying when to override the identified source address network parameter, and an override value for the identified source address network parameter;
   determine the switch criterion included in the message is met by a particular network communication of the network communications;
   override the identified source address network parameter of the particular network communication with the override value included in the message in response to the switch criterion included in the message being met; and
   transmit the particular network communication including the overridden source address network parameter to the target node.

2. The first device of claim 1, further comprising a shared memory, the shared memory configured for access by the first device and the second device, wherein the message from the second device is received via the shared memory.

3. The first device of claim 1, wherein the message is received from a wireless node array controller (WNAC) via wireless network.

4. The first device of claim 1, the processing circuitry further configured to:
   decode the message to identify an instruction to overwrite a transport level service access point (SAP) source port number with a first value; and
   override the transport level SAP source port number of the particular network communication with the first value in response to the switch criterion being met.

5. The first device of claim 4, wherein the transport level SAP source port number is a universal datagram protocol (UDP) source port number.

6. The first device of claim 4, the processing circuitry further configured to specify, via a network application, the transport level SAP source port number.

7. The first device of claim 1, the processing circuitry further configured to:
   decode the message to identify an instruction to override a link level source address of the network communications with an address selected from an indicated link level address range;
   select an address from the link level address range; and
   override the link level source address of the particular network communication with the selected address.

8. The first device of claim 7, the processing circuitry further configured to:
   assign a plurality of link level addresses from the link level address range to a corresponding plurality of network application source ports; and
   perform time division multiplexing by transmitting packets having the network application source ports via the corresponding assigned link level addresses.

9. The first device of claim 1, the processing circuitry further configured to periodically switch the override value to a different value.

10. The first device of claim 1, the processing circuitry further configured to switch the source address network parameter with the override value in response to an amount of data transmitting transgressing a data threshold.

11. The first device of claim 1, the processing circuitry further configured to:
    decode the message to identify an instruction to override a network level source address of the network communications; and
    override a network level source address of the particular network communication with the instructed network level source address.

12. The first device of claim 11, wherein the network level source address is an Internet Protocol (IP) address.

13. A method to transmit data to a target node, the method comprising:
    performing network communications on behalf of a network application executing on a communication device, the network communications configured, via one or more network parameters of a network protocol stack, for transmission to the target node;
    receiving a message from a device, the message including an identifier of a source address network parameter of the one or more network parameters to override, a switch criterion field identifying a switch criterion of when to override the source address network parameter, and an override value for the source address network parameter;
    determining the switch criterion included in the message is met by a particular network communication of the network communications;
    overriding the identified source address network parameter of the particular network communication with the override value indicated in the message in response to the switch criterion included in the message being met; and
    transmitting the particular network communication including the overridden source address network parameter to the target node.

14. The method of claim 13, further comprising:
    decoding the message to identify an instruction to overwrite a transport level service access point (SAP) source port number with a first value; and
    overriding the transport level SAP source port number of the particular network communication with the first value in response to the switch criterion being met.

15. The method of claim 13, further comprising:
    decoding the message to identify an instruction to override a link level source address of the network communications with an address selected from an indicated link level address range;
    selecting an address from the link level address range; and
    overriding the link level source address of the particular network communication with the selected address.

16. The method of claim 15, further comprising:
    assigning a plurality of link level addresses from the link level address range to a corresponding plurality of network application source ports; and
    performing time division multiplexing by transmitting packets having the network application source ports via the corresponding assigned link level addresses.

17. The method of claim 13, further comprising periodically switching the override value to a different value.

18. The method of claim 13, further comprising switching the source address network parameter with the override value in response to an amount of data transmitting transgressing a data threshold.

19. The method of claim 13, further comprising:
   decoding the message to identify an instruction to override a network level source address of the network communications; and
   overriding a network level source address of the particular network communication with the instructed network level source address.

20. A non-transitory computer readable storage medium comprising instructions that when executed configured hardware processing circuitry to perform operations comprising:
   performing network communications on behalf of a network application executing on a communication device, the network communications configured, via one or more network parameters of a network protocol stack, for transmission to a target node;
   receiving a message from a device, the message including an identifier of a source address network parameter of the one or more network parameters to override, a switch criterion field identifying a switch criterion of when to override the source address network parameter, and an override value for the source address network parameter;
   determining the switch criterion included in the message is met by a particular network communication of the network communications;
   overriding the identified source address network parameter of the particular network communication with the override value indicated in the message in response to the switch criterion included in the message being met; and
   transmitting the particular network communication including the overridden source address network parameter to the target node.

* * * * *